(12) United States Patent
Liu et al.

(10) Patent No.: US 10,782,828 B2
(45) Date of Patent: Sep. 22, 2020

(54) OPTICAL TOUCH APPARATUS AND OPTICAL TOUCH METHOD

(71) Applicant: Wistron Corporation, New Taipei (TW)

(72) Inventors: You-Xin Liu, New Taipei (TW); Po-Liang Huang, New Taipei (TW); Kuo-Hsien Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/418,981

(22) Filed: May 21, 2019

(65) Prior Publication Data

US 2020/0241693 A1   Jul. 30, 2020

(30) Foreign Application Priority Data

Jan. 28, 2019   (TW) .............................. 108103188 A

(51) Int. Cl.
  *G06F 3/00*   (2006.01)
  *G06F 3/042*   (2006.01)
  *G06F 3/041*   (2006.01)
(52) U.S. Cl.
  CPC .......... *G06F 3/0421* (2013.01); *G06F 3/0418* (2013.01)
(58) Field of Classification Search
  CPC ............................. G06F 3/0421; G06F 3/0418
  See application file for complete search history.

(56) References Cited

U.S. PATENT DOCUMENTS 9,904,413 B2   2/2018   Lai et al.
2013/0147765 A1   6/2013   Lai et al.
2016/0334937 A1 *   11/2016   Wu ....................... G06F 3/0428

FOREIGN PATENT DOCUMENTS

TW   201324285   6/2013

OTHER PUBLICATIONS

"Office Action of Taiwan Counterpart Application," dated Jan. 17, 2020, p. 1-p. 5.

* cited by examiner

*Primary Examiner* — Wing H Chow
(74) *Attorney, Agent, or Firm* — JCIPRNET

(57) ABSTRACT

An optical touch apparatus and optical touch method are provided. The optical touch apparatus has a touch area, and includes a light source module, at least one optical sensing module, and a processing unit. The light source module includes a plurality of light emitting elements, wherein each of the plurality of light emitting elements respectively provides a detecting beam to the touch area in different time periods. The processing unit is coupled to the light source module and the at least one optical sensing module. When each of the plurality of light emitting elements provides each of the detection beams, the processing unit controls the at least one optical sensing module to detect a corresponding predetermined region of interest according to the position of each of the detection beams and thereby output a sensing signal.

18 Claims, 21 Drawing Sheets

OPTICAL TOUCH APPARATUS AND OPTICAL TOUCH METHOD

CROSS-REFERENCE TO RELATED APPLICATION

This application claims the priority benefit of Taiwan application Ser. No. 108103188, filed on Jan. 28, 2019. The entirety of the above-mentioned patent application is hereby incorporated by reference herein and made a part of this specification.

BACKGROUND OF THE DISCLOSURE

Field of the Invention

The invention is related to a touch apparatus and a touch method, and particularly related to an optical touch apparatus and an optical touch method.

Description of Related Art

In recent years, since touch-sensitive electronic products are easy to operate and have high intuitiveness, they are highly praised and appreciated by consuming public, and have gradually become a mainstream trend in the market. Among the conventional resistive, capacitive, rear projected touch screens, the touch effect of the capacitive touch screen is the best, but its cost is also the most expensive. In addition, the cost also increases along with the increase of the size of the screen, and the application of the capacitive touch screen is thus limited. To find an alternative solution to a capacitive touch screen, currently, an optical touch technique using an optical sensing module to detect a touch position has advantages such as low cost, good accuracy, etc., and has more advantages in the competitive market. The optical touch technique has also become another option for a large size touch screen.

Generally, the optical touch technique uses a light source module and an optical sensing module disposed at the edge of the screen. In addition, after guiding the touch light source to the touch area via a light guiding member of the light source module, a determination is made according to a touch feature generating by the optical sensing module due to part of light source of the touch light reflected by a touch object or blocked by the touch object and the position of the touch object is thus calculated.

However, in terms of the method of determining by part of the light reflected by the touch object, since the sensitivity of the optical sensing module is weak, the light reflected by the touch object is difficult to be detected when the detection distance is too far. Therefore, if the optical sensing module indeed generates the touch feature of the touch object, an infrared light source with stronger light intensity is necessary to be adopted. Nonetheless, at this time, since the more powerful the light is, the farther the transmission distance is, and it is more easily to be affected by the environmental interference. A wrong touch point of the touch system is thereby generated, and is disadvantages for determination. For example, if there is other highly reflective material (e.g., a mirror, a metal surface, and so on), which has higher reflection rate than that of the reflect object near the effective touch area at this time, even if the highly reflective materials are located outside of the touch area, its generated reflection signal may be clearer than that of the touch object as the reflection rate is higher than that of the touch object. Therefore, the optical sensing module thus calculates a wrong touch point position.

SUMMARY OF THE INVENTION

The invention provides an optical touch apparatus, having good accuracy.

The invention provides an optical touch method, having good accuracy.

An optical touch apparatus of the invention has a touch area. The touch area has a first side and a second side. The first side and the second side are opposite to each other. In addition, the optical touch apparatus includes a light source module, at least one optical sensing module, and a processing unit. The light source module includes a plurality of light emitting elements. The light emitting elements are adjacent to the first side of the touch area, and are arranged along the first side. Each of the plurality of light emitting elements respectively provides a detecting beam to the touch area in different time periods. At least one optical sensing module has an optical axis direction, and the optical axis direction is deviated from a traveling direction of the detecting beam in the touch area. A processing unit is coupled to the light source module and the at least one optical sensing module. The processing unit controls each of the plurality of light emitting elements of the light source module to alternately provide each of the detecting beams to the touch area. Furthermore, when each of the plurality of light emitting elements provides each of the detecting beams, the processing unit controls the at least one optical sensing module to respectively detect a corresponding predetermined region of interest according to a position of each of the detecting beams and thereby outputs a sensing signal.

An optical touch method of the invention includes the following steps. A plurality of light emitting elements of a light source module is controlled to respectively provide a detecting beam to a touch area in different time periods. The touch area has a first side and a second side. The first side and the second side are opposite to each other. In addition, the light emitting elements are adjacent to the first side of the touch area, and are arranged along the first side. At least one optical sensing module is controlled to detect a corresponding predetermined region of interest according to a position of each of the detecting beams and output a sensing signal. The at least one optical sensing module has an optical axis direction. In addition, the optical axis direction is deviated from a traveling direction of the detecting beam in the touch area.

In an embodiment of the invention, each of the detecting beams is a collimating detecting beam. The processing unit controls one of the light emitting elements of the light source module to provide the collimating detecting beam to the touch area. In addition, after steps that each of the other light emitting elements of the light source module provides each of the collimating detecting beams to the touch area are completed, the processing unit controls one of the light emitting elements of the light source module to provide the collimating detecting beam to the touch area again.

In an embodiment of the invention, the processing unit controls each of the plurality of light emitting elements of the light source module in sequence to provide the touch area to each of the collimating detecting beams.

In an embodiment of the invention, each of the detecting beams is a collimating detecting beam. The collimating detecting beam provided by each of the plurality of light emitting elements and the first side as well as the second side are respectively intersected in a first detection boundary position and a second detection boundary position. When one of the light emitting elements provides the collimating detecting beam of the light emitting element, a connection of the position of the first detection boundary position as well as the second detection boundary position of the collimating detecting beam and the position of the at least one optical sensing module defines the corresponding predetermined region of interest of the collimating detecting beam.

In an embodiment of the invention, when the processing unit respectively detects the corresponding predetermined region of interest, the at least one optical sensing module generates the sensing signal according to the received light. Besides, the processing unit determines whether the sensing signal is located in a range of the predetermined region of interest corresponding to the collimating detecting beam, and determines whether the sensing signal is greater than a threshold. If yes, after the sensing signal is determined as an effective sensing signal, the corresponding effective sensing signal is output.

In an embodiment of the invention, the width size of each of the collimating detecting beams is smaller than the size of the touch object.

In an embodiment of the invention, the quantity of the at least one optical sensing module is one, and the optical sensing module is adjacent to one of the corner adjacent to the first side.

In an embodiment of the invention, the touch area has a third side and a fourth side. The third side and the fourth side are opposite to each other, and the third side and the fourth side are connected to the first side and the second side. Furthermore, the quantity of the at least one optical sensing module is one. The optical sensing module is adjacent to the third side or the fourth side.

In an embodiment of the invention, each of the detecting beams is a collimating detecting beam. Traveling directions of the collimating detecting beams of the light emitting elements are the same.

In an embodiment of the invention, the quantity of the at least one optical sensing module is two. The optical sensing modules are respectively configured to the corresponding two corners of the touch area. Furthermore, the optical axis directions of each of the optical sensing module and traveling directions of the detecting beam in the touch area are not parallel.

In an embodiment of the invention, methods of controlling the light emitting elements of the light source module to respectively provide the collimating detecting beam to the touch area in different time periods are described as below. One of the light emitting elements of the light source module is controlled to provide the collimating detecting beam to the touch area. In addition, after steps that each of the other light emitting elements of the light source module provides each of the collimating detecting beams to the touch area are completed, the processing unit controls one of the light emitting elements of the light source module to provide the collimating detecting beam to the touch area again.

In an embodiment of the invention, a method of controlling the light emitting elements of the light source module to provide the collimating detecting beam to the touch area in different time periods is described as below. Each of the plurality of light emitting elements of the light source module is controlled in sequence to provide the touch area to each of the collimating detecting beams.

In an embodiment of the invention, methods that the at least one optical sensing module is controlled according to a position of the collimating detecting beam to respectively detect the corresponding predetermined region of interest and output the sensing signal are described as below. The sensing signal is generated according to the received light by the at least one optical sensing module. Whether the sensing signal is located in a range of the corresponding predetermined region of interest of the collimating detecting beam is determined, and whether the sensing signal is greater than a threshold is determined. If yes, the sensing signal is determined as an effective sensing signal, and the effective sensing signal is output.

Based on the above, the optical touch apparatus of the invention and the optical touch method set the predetermined region of interest for each of the plurality of light emitting elements of the light source module to determine effective sensing signals. The interference of the stray light signal reflected by a highly reflective object in the environment is thus filtered, thereby improving the accuracy of the touch point position.

To provide a further understanding of the aforementioned and other features and advantages of the disclosure, exemplary embodiments, together with the reference drawings, are described in detail below.

DESCRIPTION OF THE EMBODIMENTS

Figure 1A:
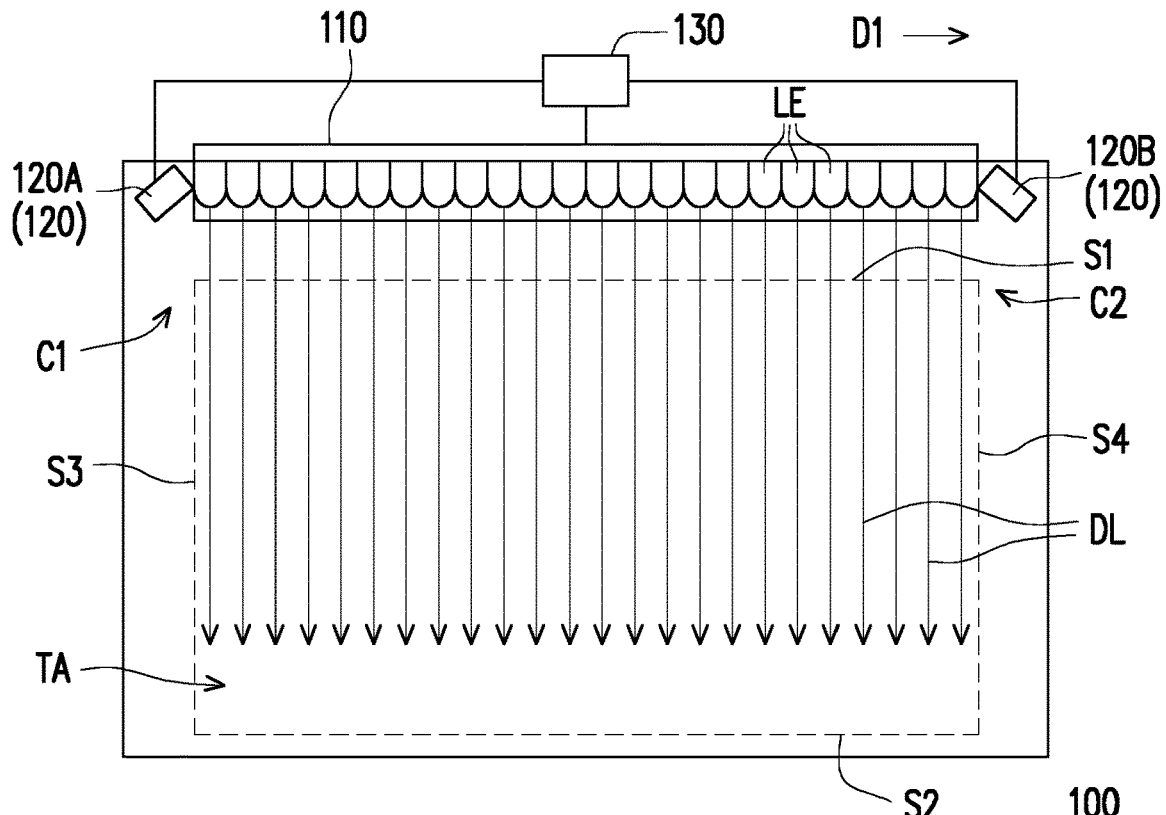
FIG. 1A is a schematic diagram of an optical touch apparatus in accordance with the embodiment of the invention.
Figure 1B:
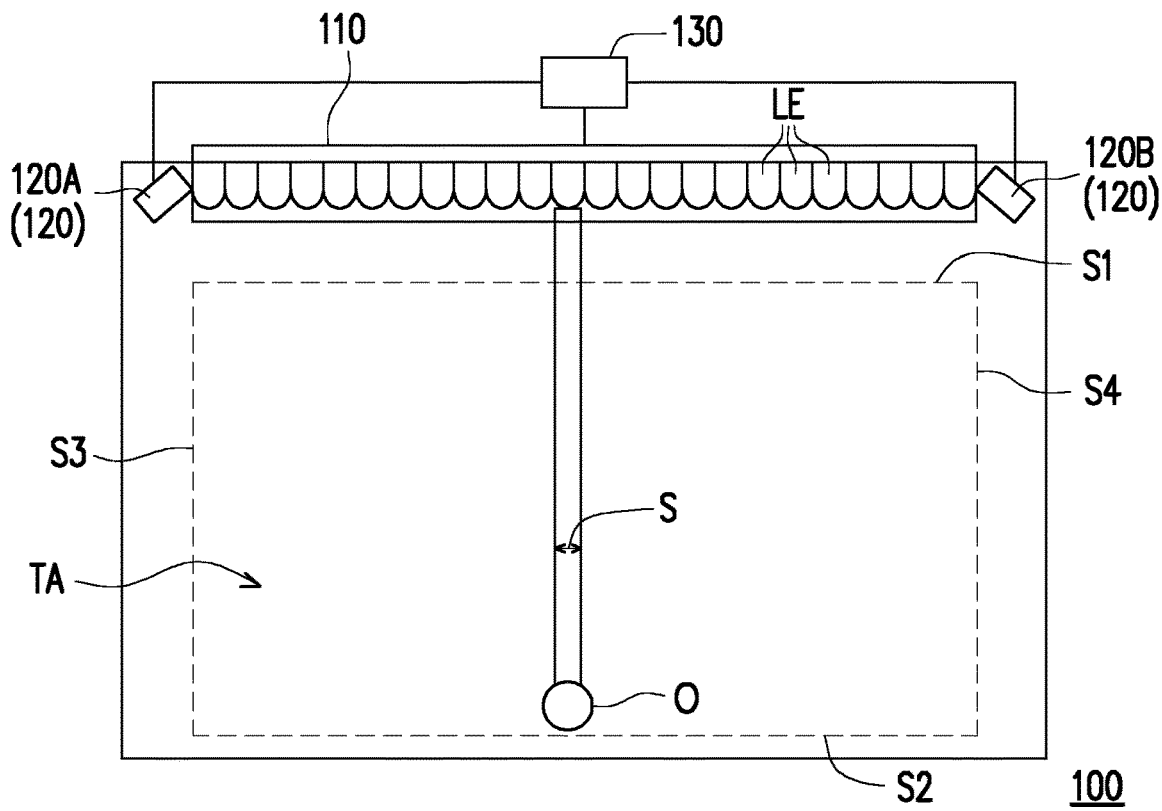
FIG. 1B to FIG. 1D are schematic diagrams of using the optical touch apparatus of FIG. 1A to detect.
Figure 1C:
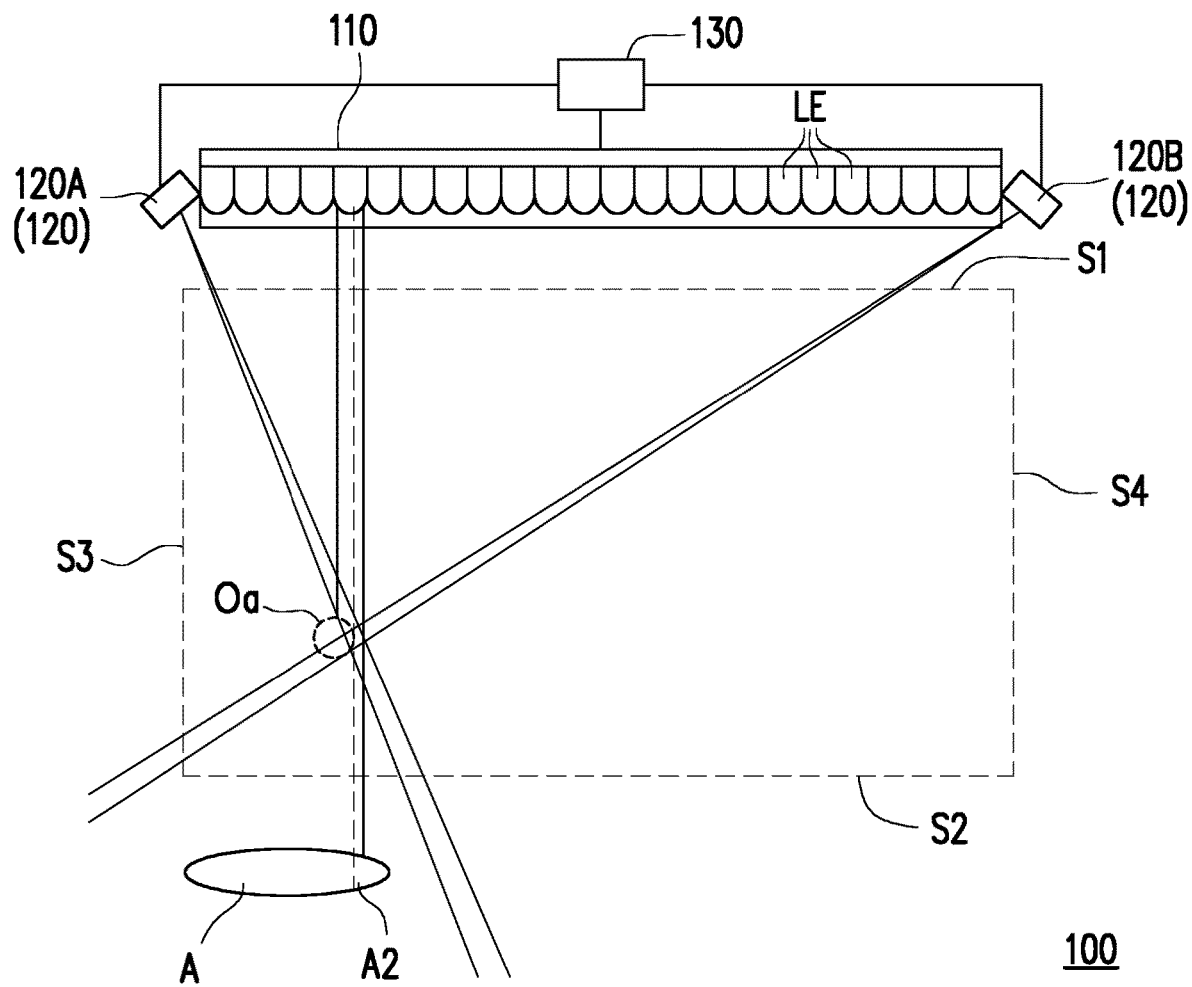
Figure 1D:
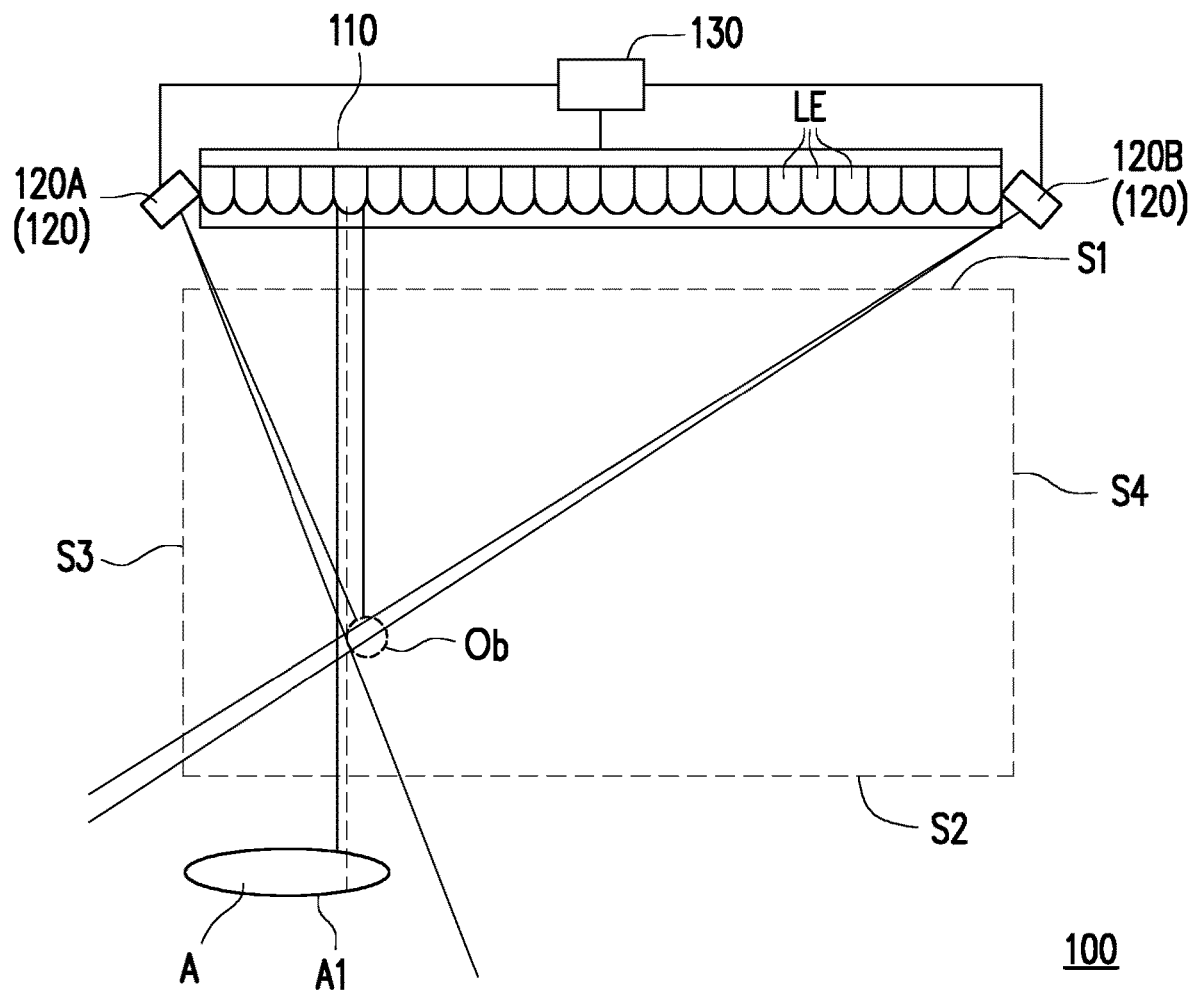

FIG. 1A is a schematic diagram of an optical touch apparatus in accordance with the embodiment of the invention. FIG. 1B to FIG. 1D are schematic diagrams of using the optical touch apparatus of FIG. 1A to detect. An optical touch apparatus 100 of the embodiment has a touch area TA. Here, the touch area TA indicates as an effective touch area of the optical touch apparatus 100, which is a virtual range region defined by a processing unit in the optical touch apparatus 100. When the optical touch apparatus 100 detects and touch calculates a touch object, the optical touch apparatus 100 only performs the detection and position calculation of the touch point in the touch area TA. The touch area TA has a first side S1, a second side S2, a third side S3, and a fourth side S4. The first side S1 and the second side S2 are opposite to each other. The third side S3 and the fourth side S4 are opposite to each other, and the third side S3 is connected to one end of the first side S1 and one end of the second side S2. The fourth side S4 is connected to the other end of the first side S1 and the other end of the second side S2. The optical touch apparatus 100 includes a light source module 110, at least one optical sensing module 120, and a processing unit 130. For instance, in this embodiment, the quantity of the at least one optical sensing module 120 is two, and optical sensing modules 120A, 120B are included. The processing unit 130 is coupled to the light source module 110 and the optical sensing modules 120A, 120B. For instance, in this embodiment, the optical sensing modules 120A, 120B may be charge-coupled device (CCD) sensors or complementary metal-oxide semiconductor (CMOS) sensors. However, the invention is not limited thereto. Besides, the processing unit 130 may be a functional module implemented by hardware and/or software. The hardware may include a hardware device having a data processing function, such as a central processing unit, a chipset, a microprocessor, or the like, or a combination of the above hardware devices. In addition, the software may be an operating system, a driver, or the like. However, the invention is also not limited thereto.

Specifically, as illustrated from FIG. 1A to FIG. 1C, in this embodiment, the light source module 110 includes a plurality of light emitting elements LE. The light emitting elements LE are adjacent to the first side S1 of the touch area TA, and are arranged along an arrangement direction D1 parallel to the first side S1. For instance, each of the plurality of light emitting elements LE may be a light emitting diode, and may respectively provide a collimating detecting beam DL to the touch area TA in different time periods respectively. As such, since the collimating detecting beam DL may travel along a direction perpendicular to the arrangement direction, the interference of other environmental objects is thus reduced. Specifically, as illustrated from FIG. 1A to FIG. 1C, in this embodiment, traveling directions of the collimating detecting beams DL of the light emitting elements LE are the same. In addition, the width size of S of each of the collimating detecting beams DL at the farthest distance (e.g., an edge of the touch area TA) is smaller than the size of a touch object O, preferably around half of the size of the touch object O. For example, when the touch object O is a finger, which has the width about 10 mm, as illustrated in FIG. 1B, a spot may be respectively formed on the touch object O by the collimating detecting beam DL. At this time, the size of the spot (that is, the width size of S) is required to be controlled at the width about 5 mm. As such, since the width size of S of the collimating detecting beam DL is small, the coupling of the stray light reflected by the reflective object in the environment and the reflection signal of the finger may be properly avoided, and the determining accuracy of the touch point is further improved.

On the other hand, as illustrated in FIG. 1, in this embodiment, the optical sensing modules 120A, 120B are respectively configured corresponding to two corners C1, C2 of the touch area TA. For example, in this embodiment, the optical sensing modules 120A, 120B are respectively configured corresponding to the two corners C1, C2 of an edge of the first side S1 of the touch area TA. Specifically, as illustrated from FIG. 1A to FIG. 1C, in this embodiment, optical axis directions of the optical sensing modules 120A, 120B are deviated from traveling directions of the collimating detecting beam DL in the touch area TA. That is, the optical axis direction of the optical sensing modules 120A, 120B and a traveling direction of the collimating detecting beam DL are not parallel, or the optical axis direction of the optical sensing module and the traveling direction of the collimating detecting beam DL are not overlapped. Specifically, the processing unit 130 controls each of the plurality of light emitting elements LE of the light source module 110 to alternately provides each of the collimating detecting beams DL to the touch area TA. In addition, when each of the plurality of light emitting elements LE provides each of the collimating detecting beams DL, the processing unit 130 controls the at least one optical sensing modules 120A, 120B to detect and output one corresponding effective sensing signal, and the processing unit 130 calculates a position of the touch object O on the touch area TA according to the effective sensing signals.

However, if the optical sensing modules 120A, 120B indeed generate touch features of the touch object O, an infrared light source with stronger light intensity is necessary to be adopted. Nonetheless, at this time, since the more powerful the light is, the farther the transmission distance is, and it is more easily to be affected by the environmental interference. A wrong touch point of the touch system is generated, and is disadvantages for determination. For example, if there is one highly reflective material (e.g., a mirror, a metal surface, and so on), which has higher reflection rate than that of the touch object O, near the effective touch area at this time, even if the highly reflective materials are located outside of the touch area TA, the generated reflection signal may be clearer than that of the touch object O as the reflection rate thereof is much higher than that of the touch object O. The optical sensing modules 120A, 120B thus calculate wrong touch point positions.

Generally, the source of the environmental stray light is mainly from an interference of an external light source of the system and a reflective useless signal of an active light source of the system (that is, the light source module 110). Regarding the former, since an interference of an external light source of the system exists both in an image signal acquired when the light source module 110 is turned on and an image signal acquired when the light source module 110 is turned off, when a signal is processed, different image signals are respectively acquired when the light source module 110 is turned on and is turned off, and the two video signals are subtracted from each other, at this time, the interference of the external light source may be deducted. On the other hand, regarding the later, on the reflective useless signal of the active light source of the system (that is, the light source module 110), the possible sources of the interference of the environmental stray light may originally be three blocks, which are a left side, a right side (from the third side S3 or the fourth side S4), and a ground side (that is, a front side of the light source module 110). However, in this embodiment, since the traveling direction of the collimating detecting beam DL is facing toward the second side S2 of the touch area TA, as such, environmental interferences from the third side S3 or the fourth side S4 of the touch area TA may be avoided, so that the environmental interferences are controlled in front of the light source module 110 (that is, facing toward the second side S2). As such, the possible sources of the interference of the environmental stray light may be simplified, and the issue of the interference of the environmental stray light of the second side S2 may be further solved by the processing unit 130.

Further explanations will be provided below with reference to FIG. 1C to FIG. 1D.

More specifically, as illustrated from FIG. 1C and FIG. 1D, although the width size of S of each of the collimating detecting beams DL is smaller than the touch object O, since the touch object O may move or be on an edge of each of the collimating detecting beams DL, the touch object O may not completely shield the collimating detecting beam DL, and result in leakage. For example, as illustrated in FIG. 1C, when the touch object O is in a position Oa, the collimating detecting beam DL leaks through the right side of the touch object O, and is reflected by a part of A2 of the highly reflective object A. On the other hand, as illustrated in FIG. 1D, when the touch object O moves right to a position Ob, the collimating detecting beam DL leaks through left side edge of the touch object O, and is reflected by a part A1 of the highly reflective object A.

At this time, the optical sensing module 120A located in the side of the third side S3 receives the stray light signal SA reflected by the highly reflective object A. As for stray light signal SA1, SA2 reflected by the part of A1 and the part of A2 of the highly reflective object A, since signal positions of the stray light signals SA1, SA2 and a touch point signal SO are different, they are thus failed to be coupled to the touch point signal SO, and are determined as different signals. On the other hand, as illustrated in FIG. 1C, as for the optical sensing module 120B located on the fourth side S4, since the signal positions of the stray light signals SA1, SA2 and the touch point signal SO are also different, they are thus failed to be coupled to the touch point signal SO, and are determined as different signals.

Since the stray light signal SA reflected by the highly reflective object A has the above characteristics, that is, the position of the stray light signal SA and the touch point signal SO are not the same, the optical touch apparatus 100 of the embodiment controls the optical sensing modules 120A, 120B according to the positions of each of the collimating detecting beams DL by the processing unit 130 to respectively detect one of the corresponding predetermined region of interest RI. In other words, the optical touch apparatus 100 of the embodiment may set the predetermined region of interest RI of the optical sensing modules 120A, 120B, as such, field borders of the optical sensing modules 120A, 120B are also limited. The highly reflective object A is thus isolated from the predetermined region of interest RI of the optical sensing modules 120A, 120B. At this time, the stray light signal SA of the highly reflective object A does not lead to the processing unit 130 detecting by mistake, which affects the determination and operation of the optical touch apparatus 100.

The functions of the components and modules of the optical touch apparatus 100 of the embodiment will be further provided below with reference to FIG. 2A to FIG. 4E. With reference to FIG. 2A to FIG. 2E, the definition of the predetermined region of interest RI, and how the calculation method for the effective sensing signal is determined are further elaborated. Then, with reference to FIG. 3A to FIG. 3F, the source and the characteristics of an invalid sensing signal are further elaborated. After that, the operation steps of the optical touch apparatus 100 are further elaborated with reference to FIG. 4A to FIG. 4E.

Figure 2A:
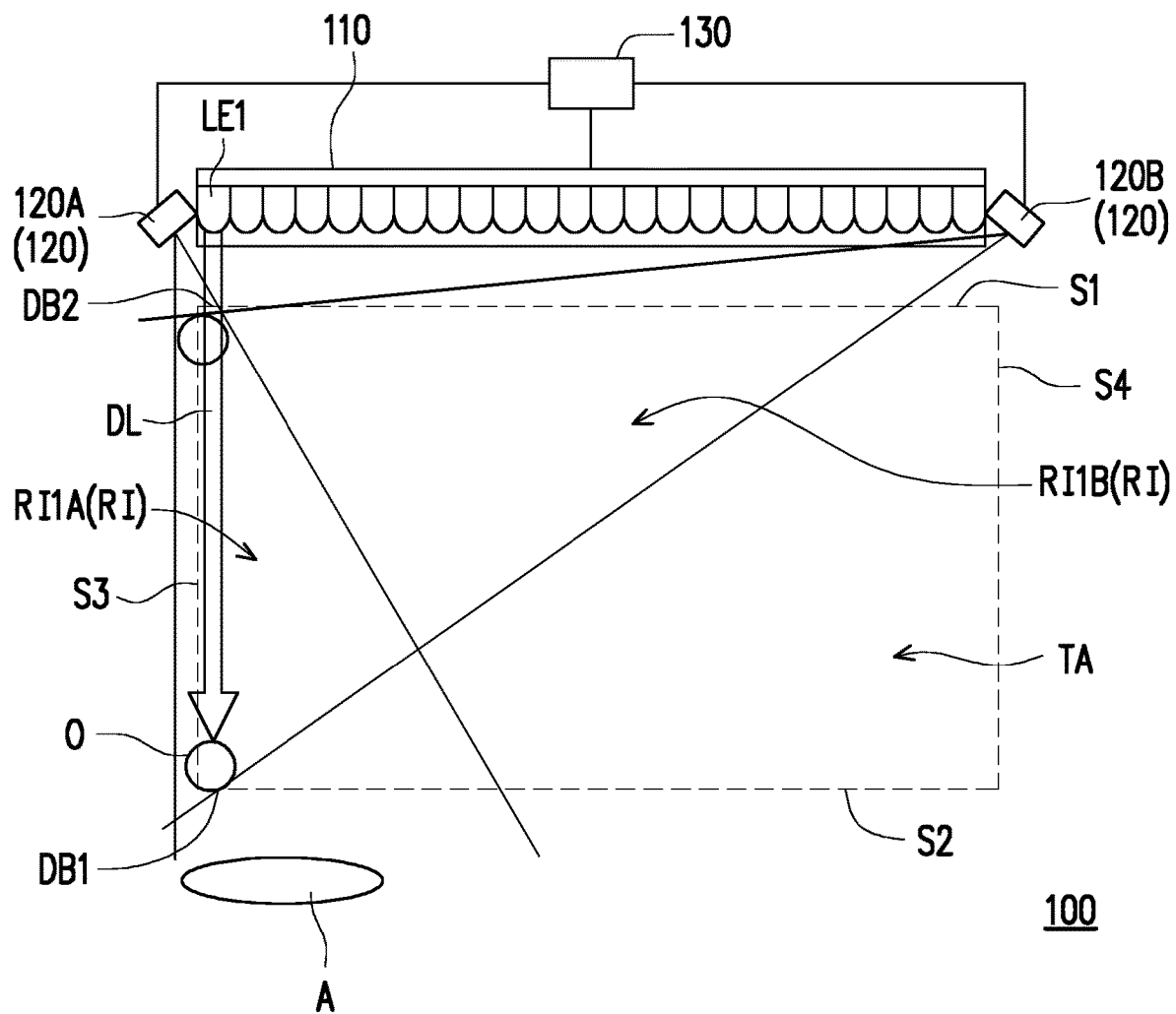
FIG. 2A to FIG. 2C are schematic diagrams of different predetermined regions of interest light emitting corresponding to different light emitting elements of the light source module of FIG. 1A.
Figure 2B:
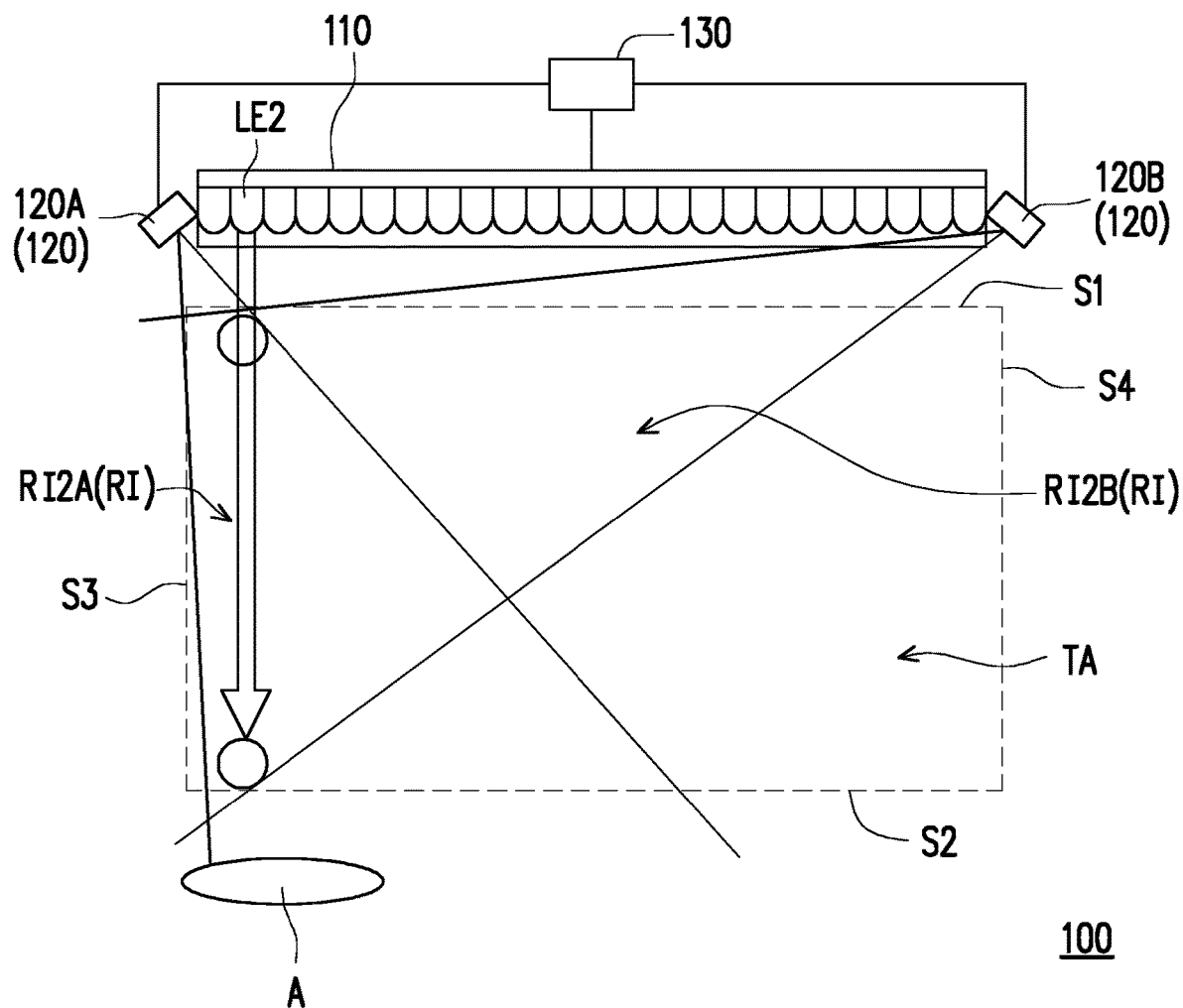
Figure 2C:
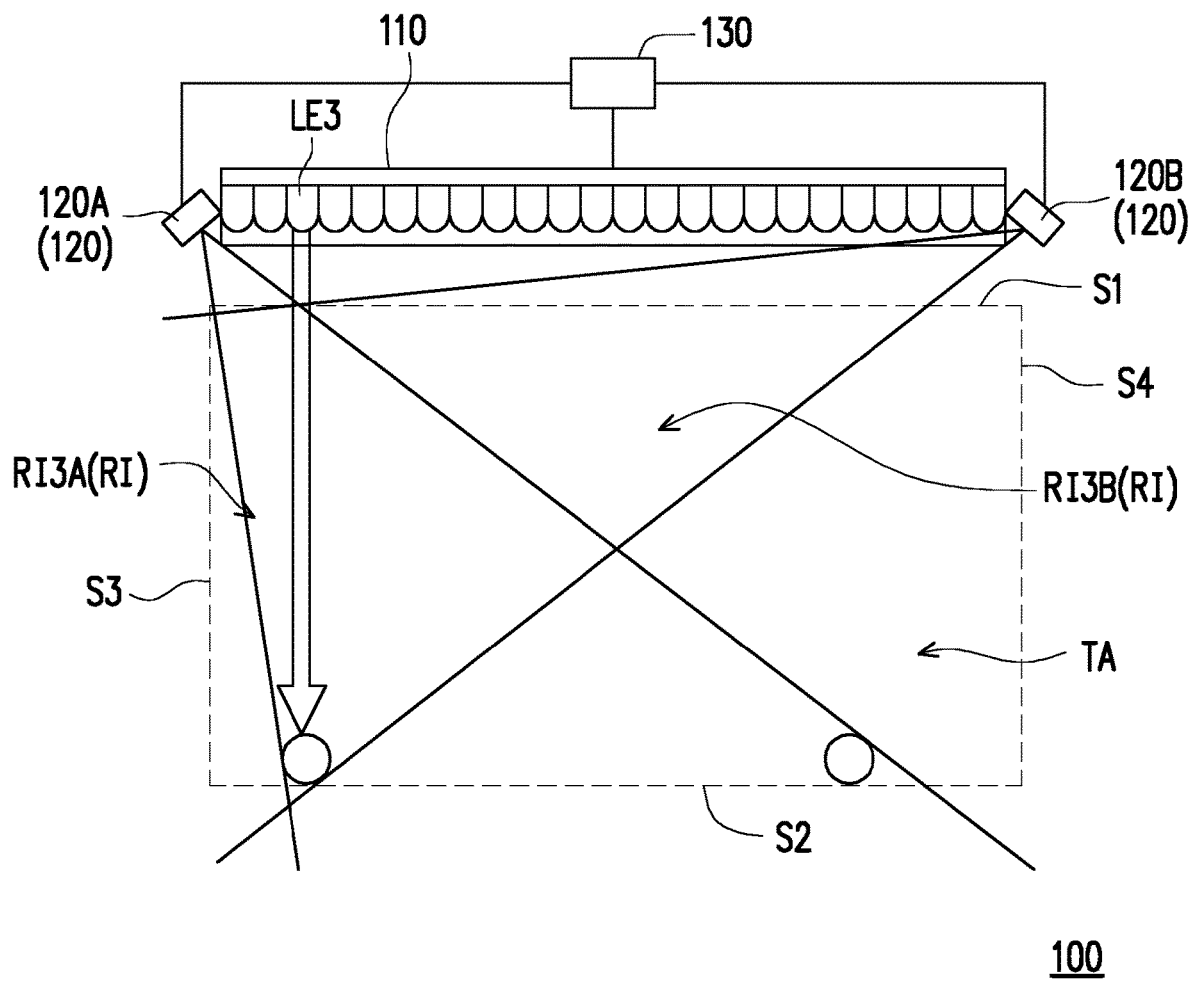
Figure 2D:
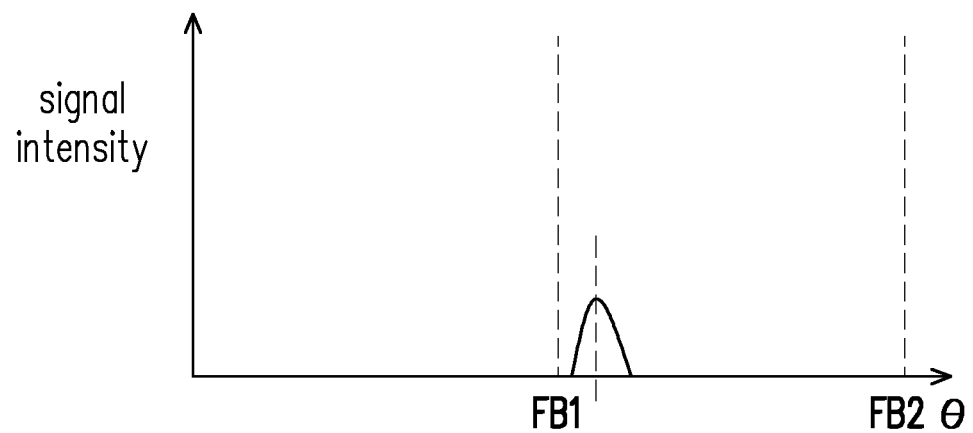
FIG. 2D to FIG. 2E are schematic diagrams of sensing signal of the optical sensing module of FIG. 2C.
Figure 2E:
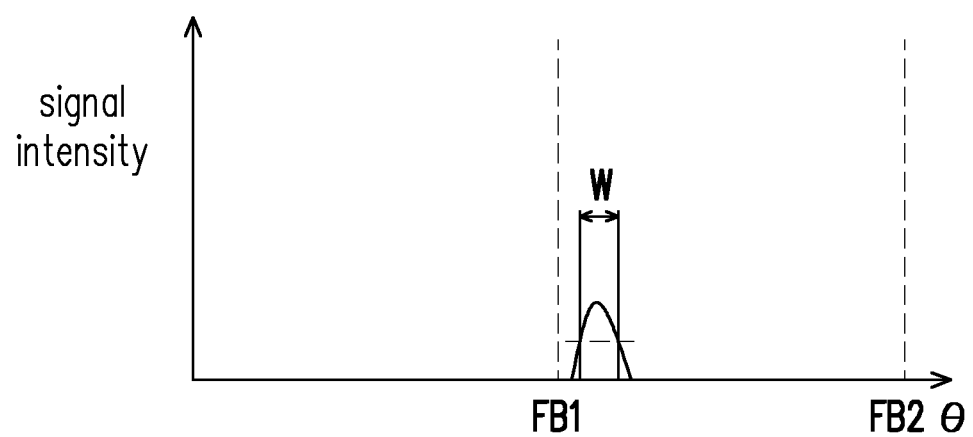

FIG. 2A to FIG. 2C are schematic diagrams of different predetermined regions of interest corresponding to different light emitting elements of the light source module of FIG. 1A. FIG. 2D to FIG. 2E are schematic diagrams of sensing signal of an optical sensing module of FIG. 2C. Please refer to FIG. 2A to FIG. 2C. In this embodiment, each of the plurality of light emitting elements LE has a set of the corresponding predetermined region of interest RI in the different optical sensing modules 120A, 120B. Specifically, in this embodiment, the collimating detecting beam DL and the first side S1, and the second side S2 provided by each of the plurality of light emitting elements LE are respectively intersected in a first detection boundary position DB1 and a second detection boundary position DB2. When one of the light emitting elements LE provides the collimating detecting beam DL, a connection of the position of the first detection boundary position DB1 as well as the second detection boundary position DB2 of the collimating detecting beam DL and the position of the at least one optical sensing modules 120A, 120B defines the corresponding predetermined region of interest RI of the collimating detecting beam DL in the at least one optical sensing modules 120A, 120B. As such, each of the plurality of light emitting elements LE has a set of the corresponding predetermined region of interest RI in the optical sensing modules 120A, 120B. When the light emitting element LE are lighted up in sequence, the corresponding predetermined region of interest RI respectively located in two corners of the touch area of the optical sensing modules 120A, 120B are switched to the corresponding predetermined region of interest RI of the lighted light emitting element LE.

For example, as illustrated in FIG. 2A, for example, when a first light emitting element LE1 adjacent to the side of the third side S3 is lighted, the optical sensing modules 120A, 120B respectively have corresponding predetermined region of interests RI1A, RI1B. As illustrated in FIG. 2B, for example, when a second light emitting element LE2 adjacent to the side of the third side S3 is lighted, the optical sensing modules 120A, 120B are switched to the corresponding predetermined region of interests RI2A, RI2B of the second lighted light emitting element LE2. Accordingly, as illustrated in FIG. 2C, when a third light emitting element LE3 adjacent to the side of the third side S3 is lighted, the optical sensing modules 120A, 120B are switched to the corresponding predetermined region of interests RI3A, RI3B of the third lighted light emitting element LE3.

Furthermore, FIG. 2D illustrates the sensing signals received by the optical sensing modules 120A, 120B in the different time periods. The horizontal axis is the corresponding pixel position for receiving signal, and the vertical axis is signal strength. In this embodiment, the processing unit 130 acquires the highest point of the sensing signal as the signal position, and determines whether the signal position is greater than a field border FB1 and smaller than a field border FB2. If the determination result is "yes", the processing unit 130 determines that the sensing signal falls into the predetermined region of interest RI of the optical sensing modules 120A, 120B. If the determination result is "no", the processing unit 130 determines that the sensing signal falls outside of the predetermined region of interest RI of the optical sensing modules 120A, 120B.

In addition, as illustrated in FIG. 2E, to filter useless signals, apart from setting the predetermined region of interest RI, the optical sensing modules 120A, 120B and the processing unit 130 further sets a predetermined threshold for the lowest signal width. When the processing unit 130 determines that the signal width of the sensing signal received by the optical sensing module 120A, 120B must be greater than the predetermined threshold, the touch point signal SO is thus determined. In general, the shape of the touch signal is in a square wave or a Gaussian waveform. Since the shape of the touch signal are not the same shape, the width of the touch signal is defined by a half height width W (FWHM) of the signal. For example, the farther the touch object O is from the optical sensing modules 120A, 120B, the smaller the signal width is. Therefore, the predetermined threshold is determined by the farthest detection point (i.e., the edge of the touch area TA).

As such, as illustrated from FIG. 2A to FIG. 2E, in this embodiment, when the sensing signals received by the optical sensing modules 120A, 120B are determined to fall within the predetermined region of interest RI of the optical sensing modules 120A, 120B, and is greater than the predetermined threshold, and the touch point signal SO is thus determined. At this time, the processing unit 130 then controls the optical sensing modules 120A, 120B to output one corresponding effective sensing signal, and calculates the touch point position based on the corresponding effective sensing signal.

Figure 3A:
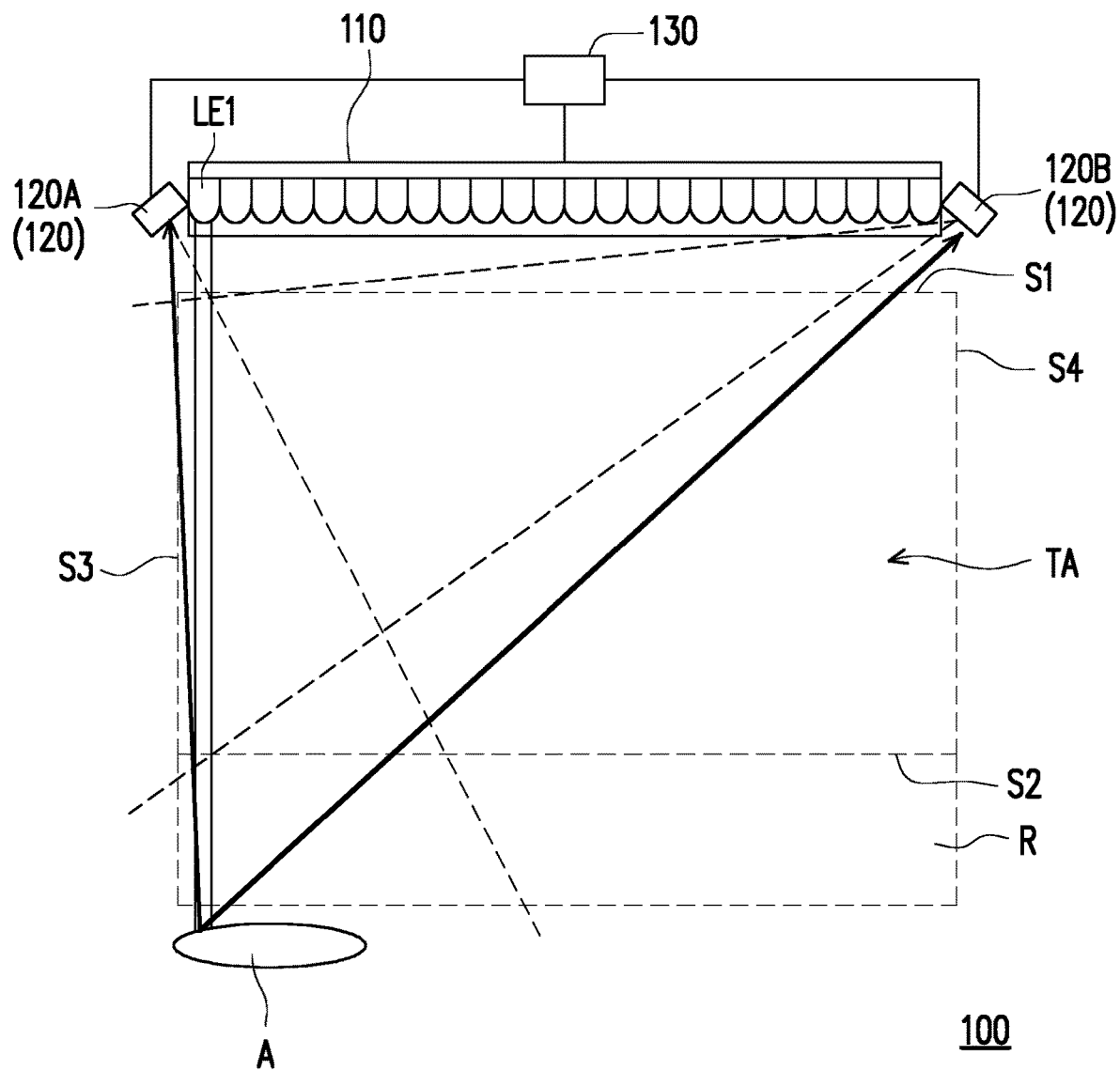
FIG. 3A to FIG. 3F are schematic diagrams of touch areas and invalid sensing signals of FIG. 1A of the optical touch apparatus.
Figure 3B:
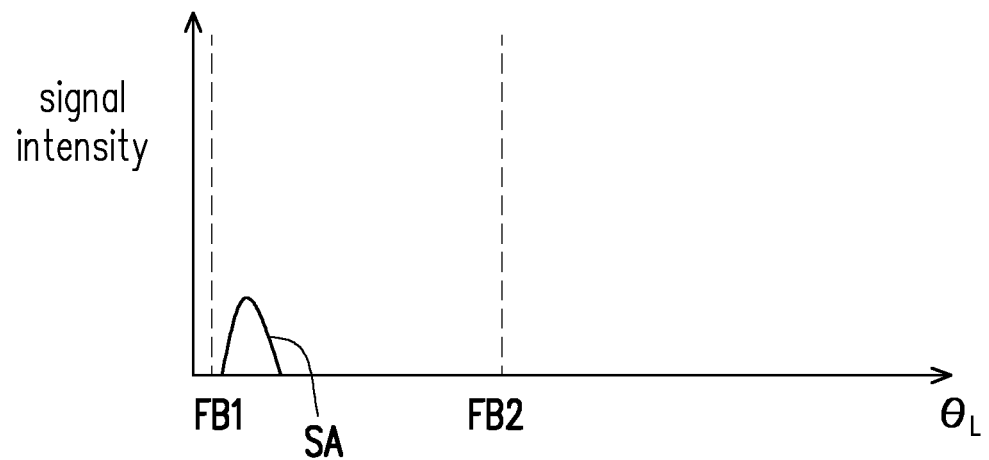
Figure 3C:
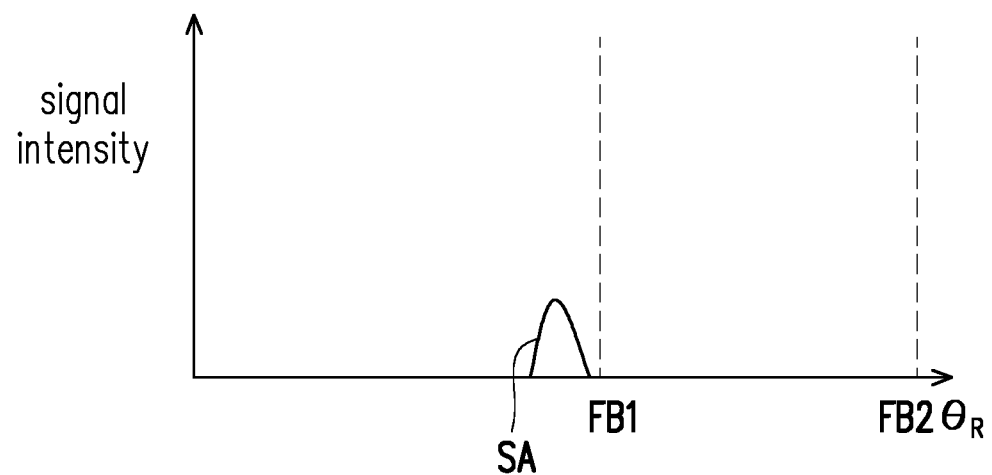

FIG. 3A to FIG. 3F are schematic diagrams of touch areas and invalid sensing signals of FIG. 1A of the optical touch apparatus. Please refer to FIG. 3A and FIG. 3D. In this embodiment, the touch object O is not included in the touch area TA. Therefore, when the different light emitting elements LE are lighted, at this time, the sensing signal is the characteristic of the stray signal SA, that is, an invalid sensing signal. As illustrated from FIG. 3A to FIG. 3C, in this embodiment, when the first light emitting element LE1 adjacent to the side of the third side S3 is lighted, the optical sensing modules 120A, 120B located in the two corners C1, C2 respectively receive a sensing signal SA (as illustrated from FIG. 3B to FIG. 3C). As illustrated in FIG. 3B and FIG. 3C, at this time, the sensing signal SA falls into the field borders FB1, FB2 set by the optical sensing module 120A, but falls outside of the field borders FB1, FB2 set by the optical sensing module 120B. Therefore, the processing unit 130 determines the sensing signal SA as an invalid sensing signal based on the result of the optical sensing module 120B. That is, in this embodiment, as long as the sensing signal falls into one of the field borders FB1, FB2 set by the optical sensing modules 120A, 120B, the processing unit 130 determines the sensing signal as an invalid sensing signal.

Figure 3D:
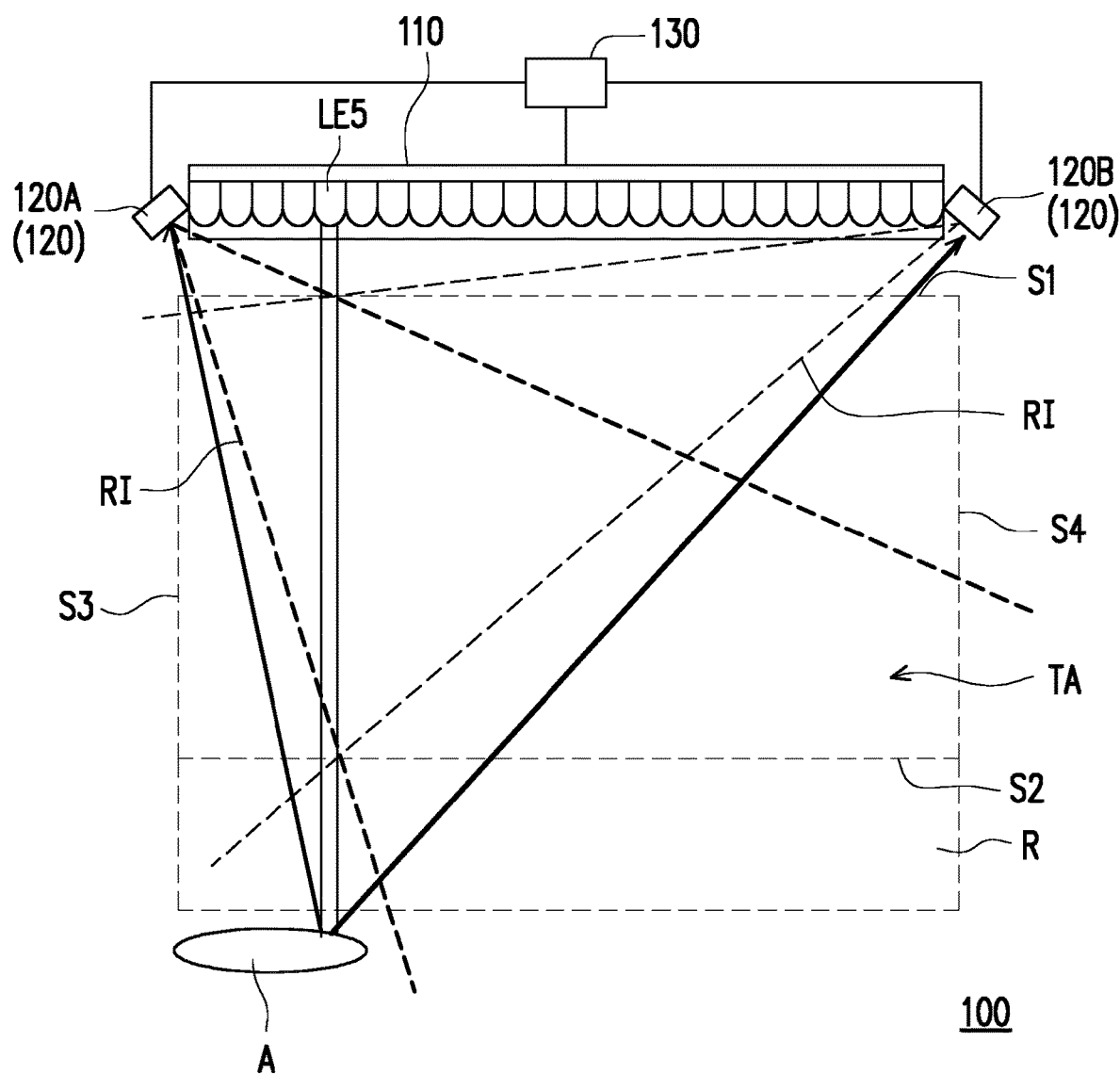
Figure 3E:
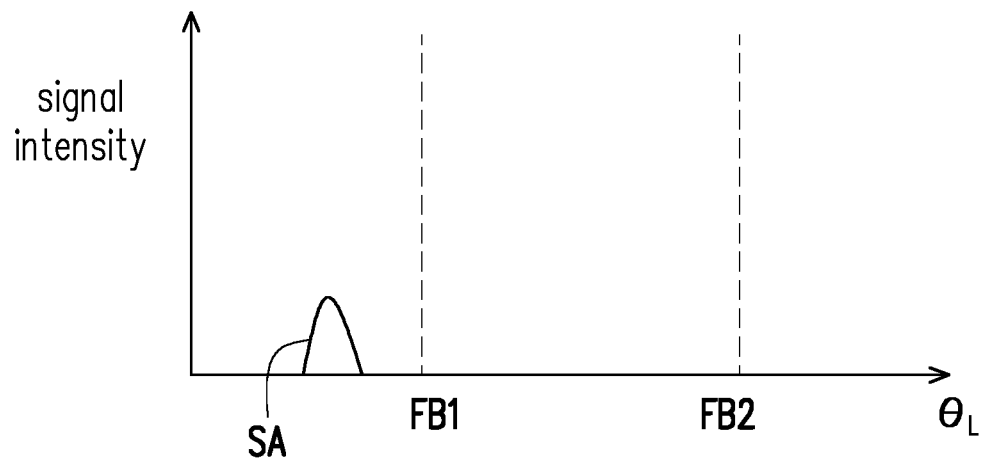
Figure 3F:
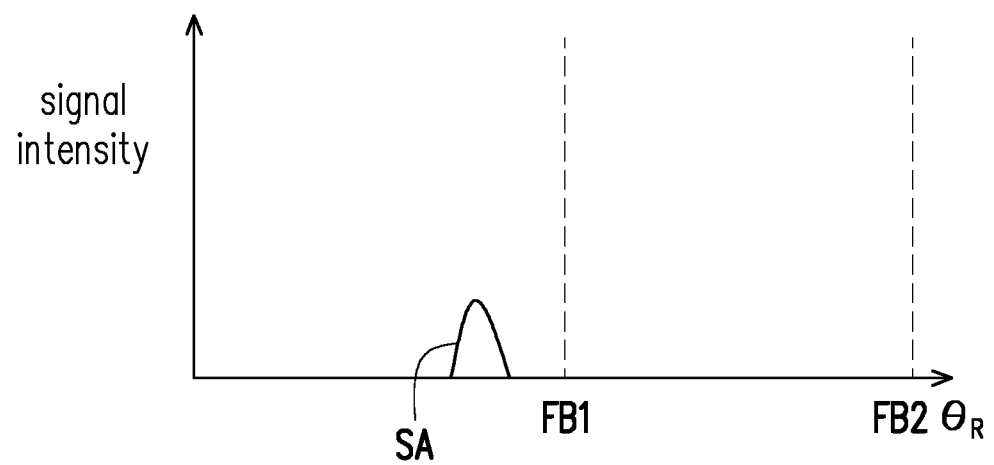

Besides, if the highly reflective object A in the environment is fairly adjacent to the edge of the touch area TA, the sensing signal SA received by the optical sensing modules 120A, 120B is very close to the field border FB1 set by the optical sensing modules 120A, 120B. Therefore, there is a certain area R required to be maintained without having an object below the touch area TA, so that at least one of the signal width is maintained for the sensing signal SA of the environmental stray light and the field border FB1 received by optical sensing modules 120A, 120B to facilitate the determination and differentiation of the difference between the effective sensing signal and the invalid sensing signal. Moreover, FIG. 3D to FIG. 3F illustrate that when a fifth light emitting element LE5 adjacent of the third side S3 is lighted, the optical sensing modules 120A, 120B receive the characteristics of the sensing signal SA of the environmental stray light. As illustrated from FIG. 3E to FIG. 3F, at this time, the sensing signal SA also falls outside of the field borders FB1, FB2 set by the optical sensing modules 120A, 120B. Hence, an invalid sensing signal is determined.

As such, according to FIG. 2A to FIG. 3F, in this embodiment, the optical touch apparatus 100 defines the predetermined region of interest RI by each of the plurality of light emitting elements LE, and determines an effective sensing signal and an invalid sensing signal. The optical touch apparatus 100 thus filters the interference of the stray light signal SA reflected by the highly reflective object A in the environment.

Figure 4A:
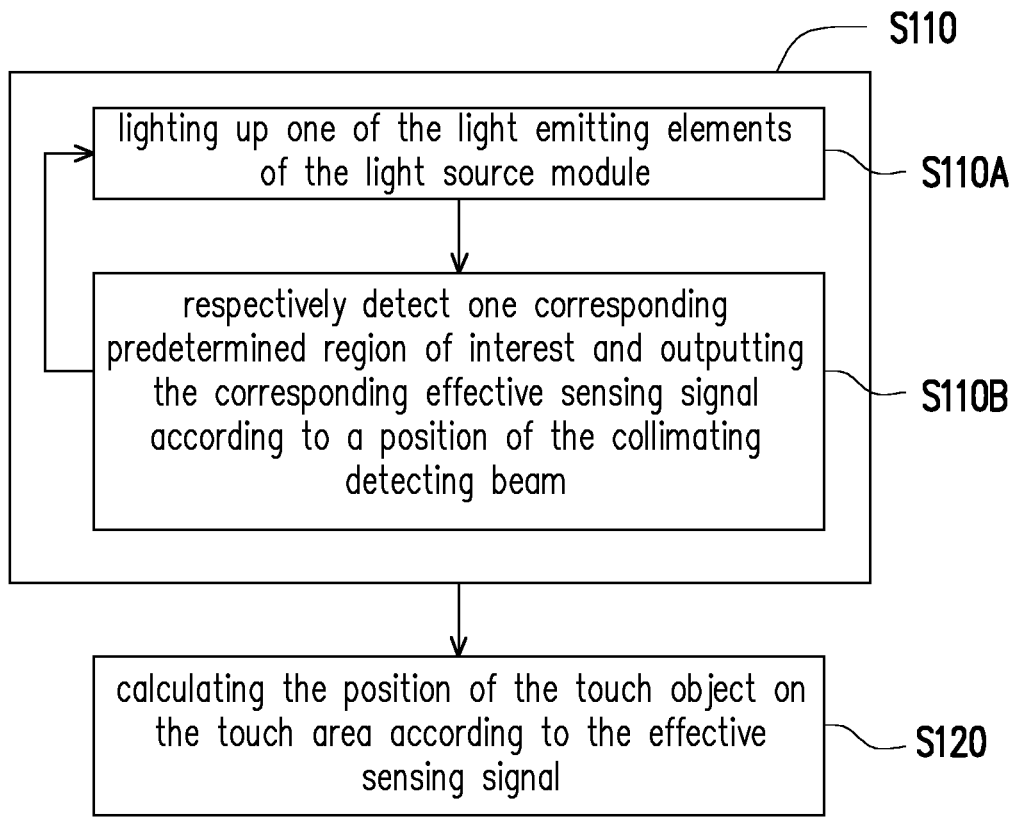
FIG. 4A is a flowchart of an optical touch method of an embodiment of the invention.
Figure 4B:
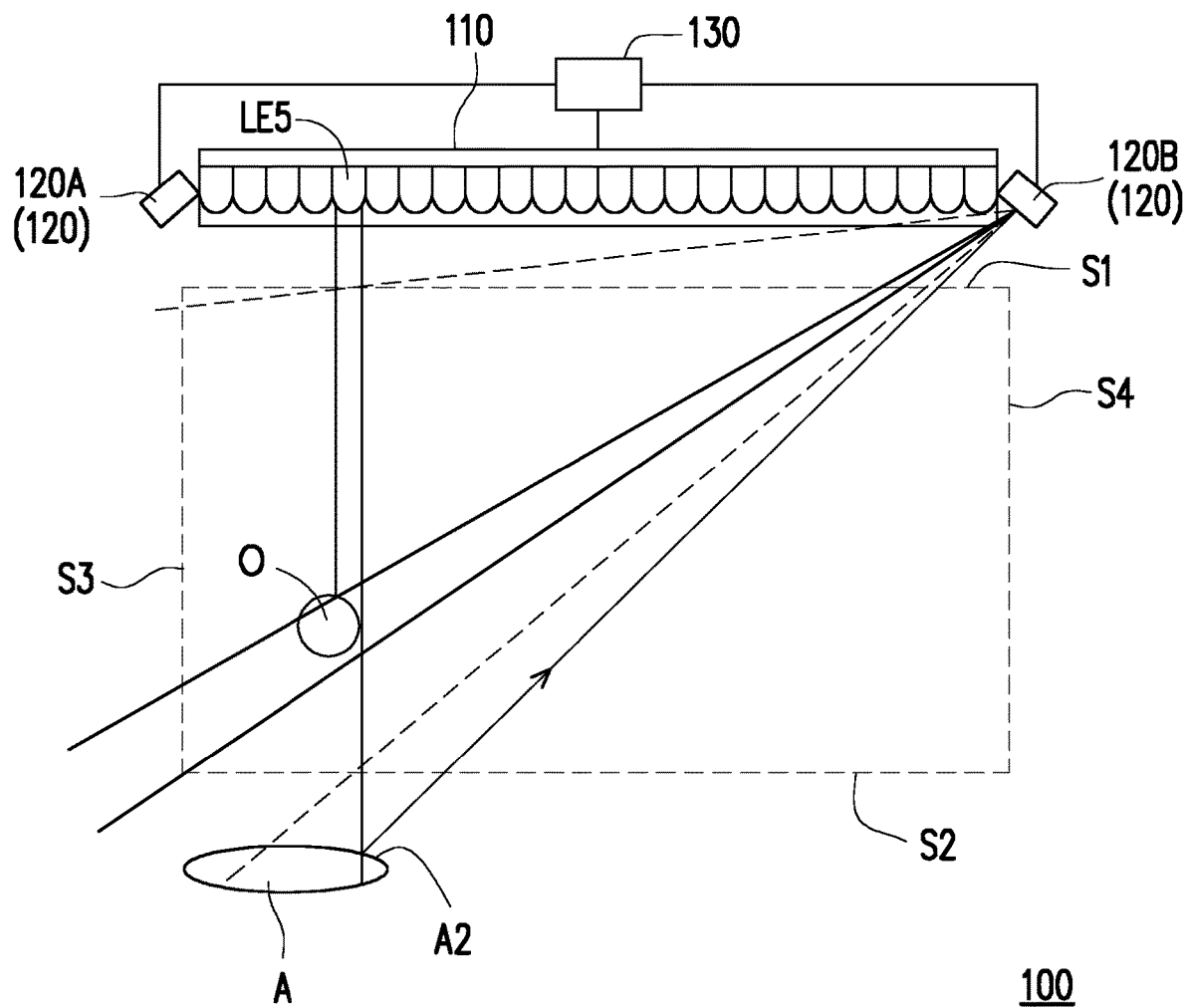
FIG. 4B to FIG. 4E are schematic diagrams of a touch point and sensing signals of the optical touch apparatus of FIG. 1A.
Figure 4C:
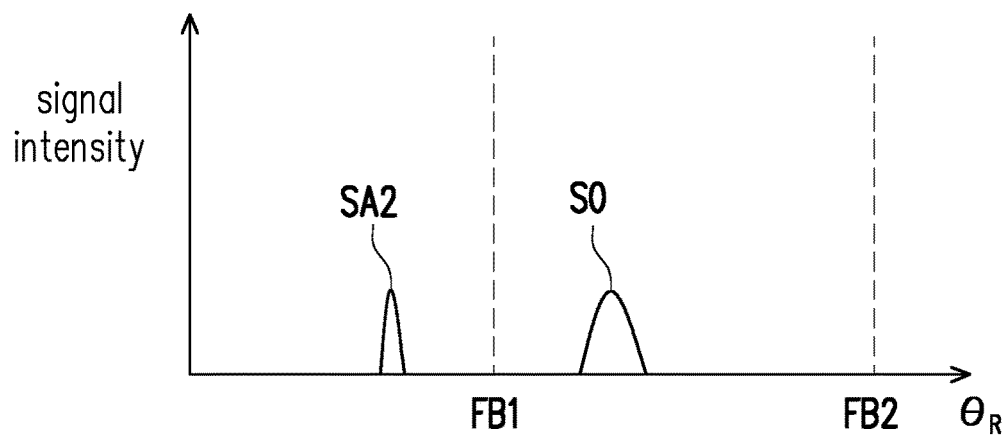
Figure 4D:
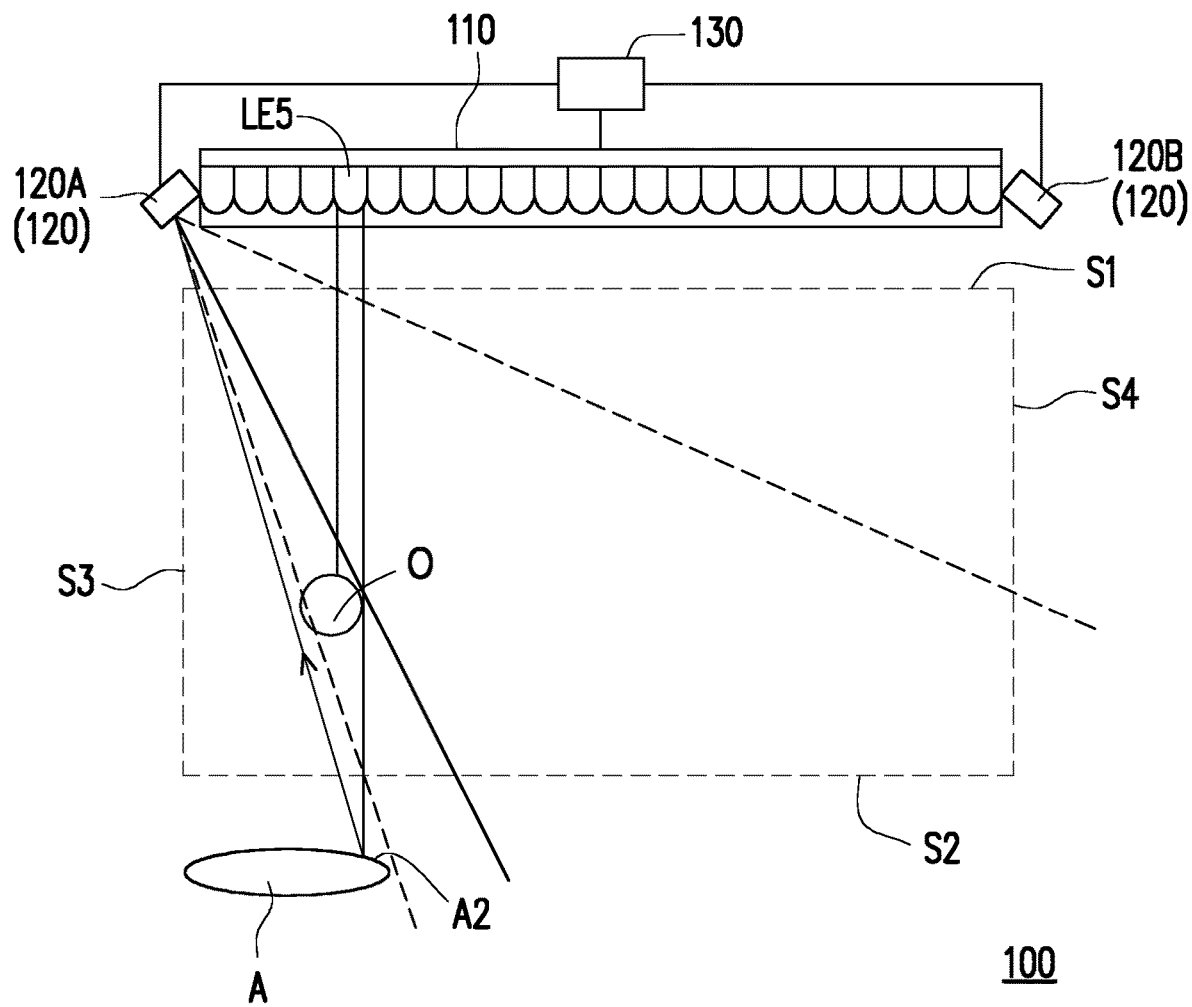
Figure 4E:
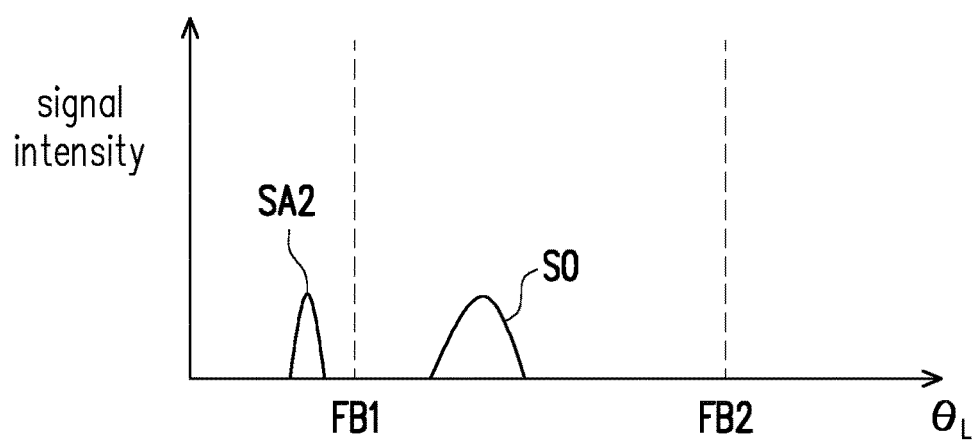
Figure 4F:
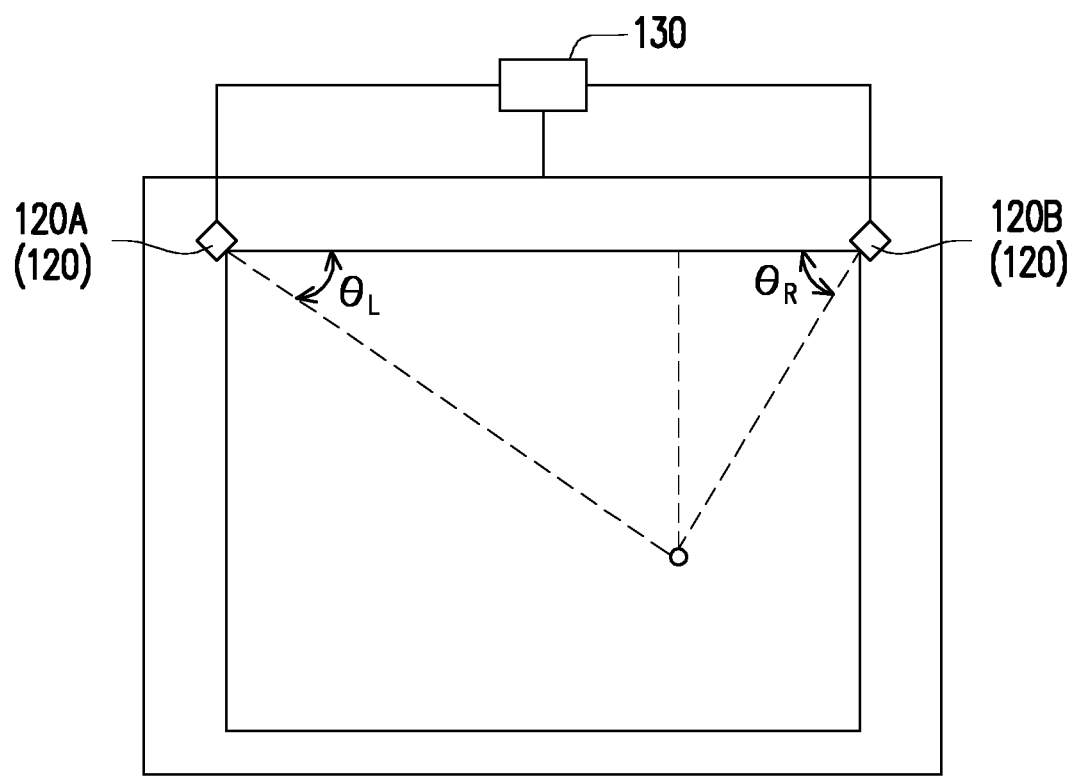
FIG. 4F is a schematic diagram of a touch point calculation method of an optical touch apparatus of FIG. 1A.

FIG. 4A is a flowchart of an optical touch method of an embodiment of the invention. FIG. 4B to FIG. 4E are schematic diagrams of touch points and sensing signals of the optical touch apparatus of FIG. 1A. FIG. 4F is a schematic diagram of a touch point calculation method of an optical touch apparatus of FIG. 1A. Please refer to FIG. 4A. In this embodiment, the optical touch method performs, for example, by applied the optical touch apparatus 100 in FIG. 1A. The optical touch method of the each of the components of the optical touch apparatus 100 of the embodiment will be further provided below with reference to FIG. 4B to FIG. 4F.

First, step S110 is performed. The plurality of light emitting elements LE of the light source module 110 are controlled to respectively provide the collimating detecting beam DL to the touch area TA in different time periods. In addition, the at least one optical sensing modules 120A, 120B is controlled to detect a position according to the collimating detecting beam DL and output the corresponding effective sensing signal. The step S110 includes the following step S110A and step S110B.

Specifically, the step S110A may be performed by the processing unit 130 that lights up one of the light emitting elements LE of the light source module 110 to provide the touch area TA to the collimating detecting beam DL. Afterwards, the step S110B may be performed by the processing unit 130. The processing unit 130 controls the at least one optical sensing modules 120A, 120B according to a position of the collimating detecting beam DL to respectively detect one corresponding predetermined region of interest RI and output the corresponding effective sensing signal.

More specifically, performing methods of the step S110B include the following steps. In this embodiment, when the processing unit 130 respectively detects the corresponding predetermined region of interest RI, the at least one optical sensing modules 120A, 120B generates one sensing signal according to the received light. The processing unit 130 determines whether the sensing signal is located in a range of the predetermined region of interest RI of the corresponding the collimating detecting beam DL, and determines whether the sensing signal is greater than a threshold. If yes, after determining the sensing signal as an effective sensing signal, the corresponding effective sensing signal is output to provide the following steps to calculate the touch point position. For example, as illustrated from FIG. 4B to FIG. 4E, take a fifth light emitting element LE5 adjacent to the side of the third side S3 that is lighted as an example. When the light emitting element LE5 is lighted, the processing unit 130 acquires the effective sensing signals as illustrated in FIG. 4C and FIG. 4E. As illustrated in FIG. 4C, the effective sensing signal acquired by the optical sensing module 120B adjacent to the fourth side S4 is the touch point signal. As illustrated in FIG. 4E, the effective sensing signal acquired by the optical sensing module 120A adjacent to the third side S3 is the touch point signal. (The definition of the predetermined region of interest RI, and the performing details of the determination of the effective sensing signal and the invalid sensing signal may be simultaneously referred to the relevant descriptions of FIG. 2A to FIG. 3F, and shall not be described herein.)

Moreover, after one of the light emitting elements LE of the light source module 110 is lighted, the processing unit 130 turns off the light emitting element LE, and then lights up another light emitting element LE. In addition, the step S110A and the step S110B are repeatedly operated. The light emitting element LE that is lit for the second time is turned off again, and another light emitting element LE is lit again. The step S110A and the step S110B are repeatedly operated again until all of the light emitting elements LE of the light source module 110 complete the step S110A and the step S110B once. In this embodiment, the processing unit 130 controls each of the plurality of light emitting elements LE in sequence to provide each of the collimating detecting beams DL to the touch area TA. However, the invention is not limited thereto. In other embodiments, the lighting of each of the plurality of light emitting elements LE may not follow a fixed order. However, it is necessary that all the light emitting elements LE are lit, the step S110A and the step S110B are performed once and are turned off, the same light emitting elements LE may perform the step S110A and the step S110B again.

In other words, when the processing unit 130 of the optical touch apparatus 100 controls one of the light emitting elements LE of the light source module 110 to provide the collimating detecting beam DL to the touch area TA, after the optical touch apparatus 100 completes the steps of providing each of the collimating detecting beams DL to the touch area TA after the other light emitting elements LE of the light source module 110 are completed, the processing unit 130 thus leads the light emitting element LE of the light source module 110 to provide the collimating detecting beam DL to the touch area TA again. For example, in this embodiment, the basic report rate of the optical touch apparatus 100 is 100 Hz. Therefore, the processing time of the processing unit 130, and the subsequent calculating time are required to complete in 10 milliseconds. Hence, the light source module 110 are required to light up all of the light emitting element LE at least once during a portion of the time (because the computing time is also required) to acquire the effective sensing signal of the touch object O on each position in the touch area TA for subsequent computing steps.

After all the light emitting elements LE of the light source module 110 complete the step S110A and the step S110B once, the processing unit 130 performs step S120. The position of the touch object O on the touch area TA is calculated according to each of the effective sensing signals. For example, as illustrated in FIG. 4F, the processing unit 130 calculates and acquires the corresponding viewing angles of the effective sensing signals in the optical sensing modules 120A, 120B, according to the corresponding pixel position of the effective sensing signals in the optical sensing modules 120A, 120B. A viewing angle of the touch object O in the touch area TA relative to the optical sensing modules 120A, 120B is further acquired. As such, according to the viewing angle information, the processing unit 130 calculates one touch coordinates by using triangulation, and an accurate touch point position is acquired.

As such, the optical touch apparatus 100 sets the predetermined region of interest RI for each of the plurality of light emitting elements LE to determine the effective sensing signal. The interference of the stray light signal SA reflected by the highly reflective object A in the environment may be filtered, and the accuracy of the touch point position is improved.

It should be noted that, in the aforementioned embodiments, although the optical touch apparatus 100 is illustrated as example of having two of the optical sensing modules 120A, 120B, the invention is not limited thereto. In other embodiments, the optical touch apparatus 100 may also have one optical sensing module. Another embodiment will be further described below for further explanations.

Figure 5A:
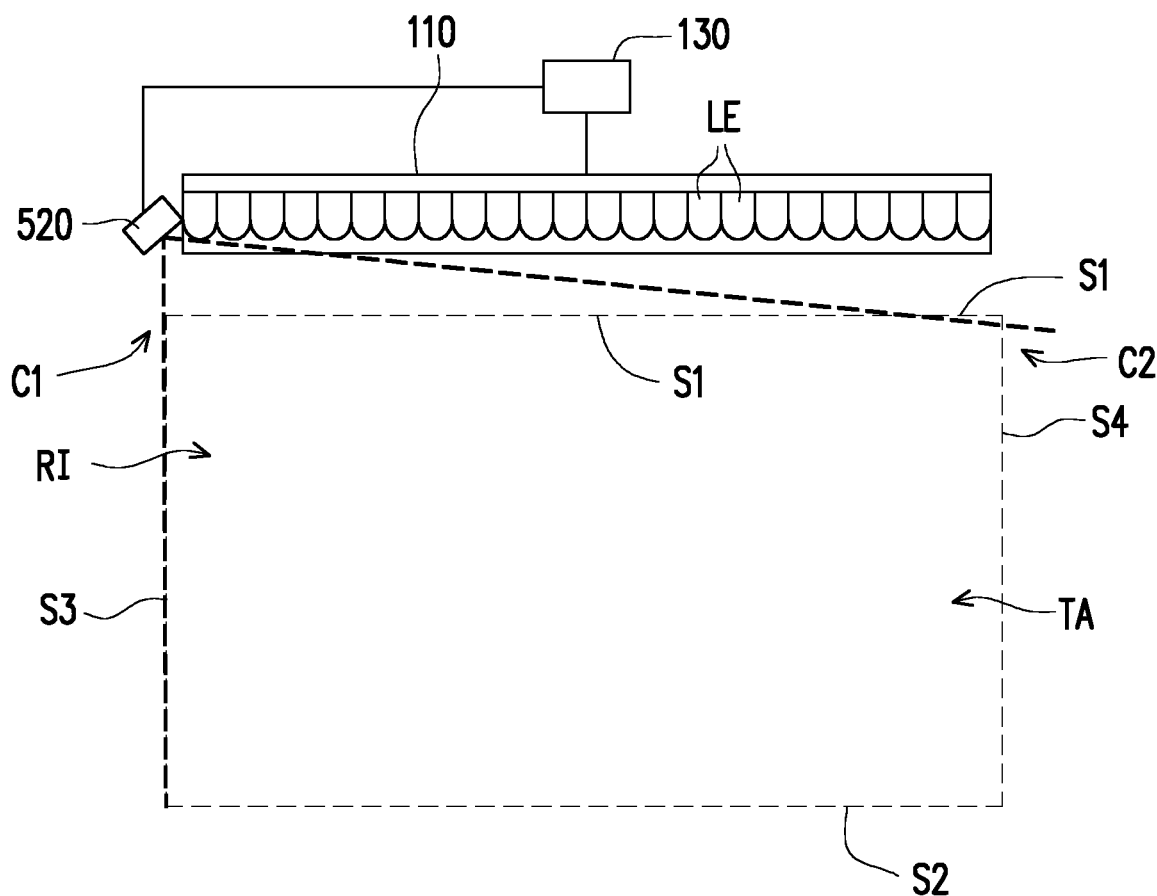
FIG. 5A is an architectural schematic diagram of another optical touch apparatus in accordance with the embodiment of the invention.
Figure 5B:
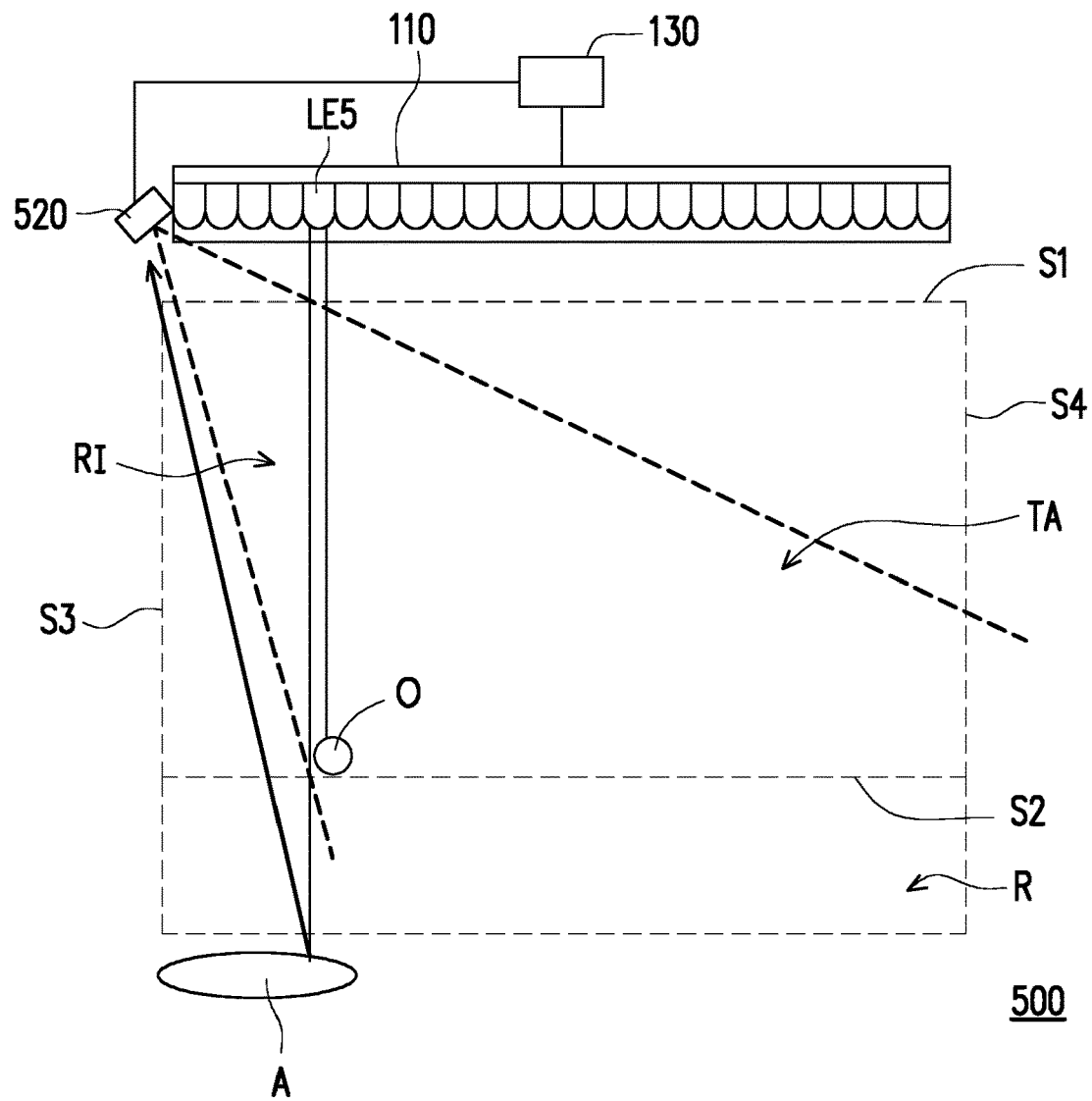
FIG. 5B to FIG. 5C are schematic diagrams of touch points and sensing signals of the optical touch apparatus of FIG. 5A.
Figure 5C:
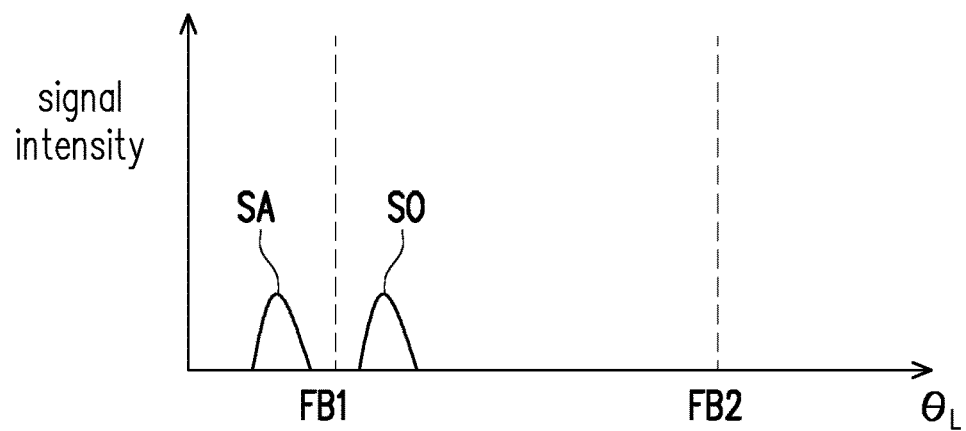
Figure 5D:
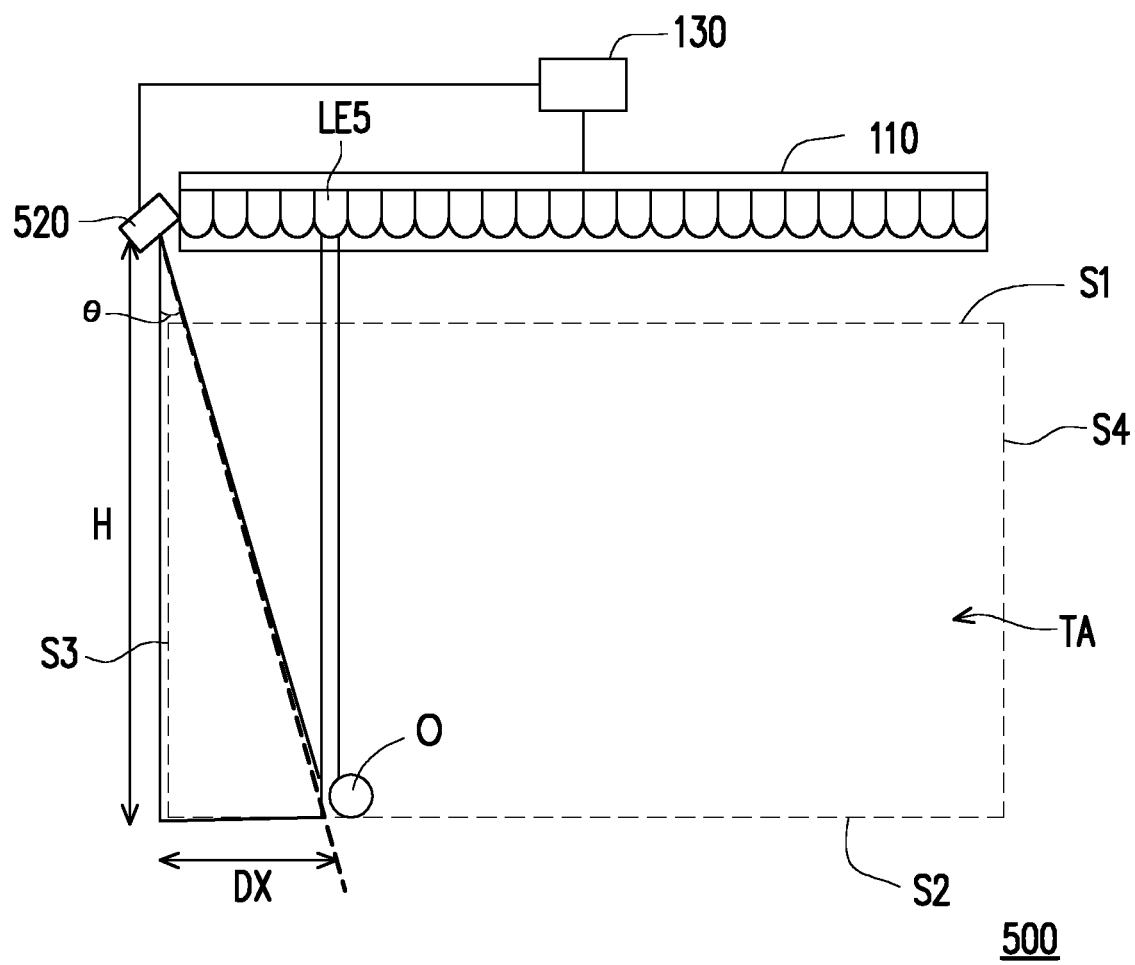
FIG. 5D is a schematic diagram of the touch point calculation method of an optical touch apparatus of FIG. 5A.

FIG. 5A is an architectural schematic diagram of another optical touch apparatus in accordance with the embodiment of the invention. FIG. 5B to FIG. 5C are schematic diagrams of touch points and sensing signals of the optical touch apparatus of FIG. 5A. FIG. 5D is a schematic diagram of the touch point calculation method of an optical touch apparatus of FIG. 5A. Please refer to FIG. 5A to FIG. 5D. An optical touch apparatus 500 of this embodiment and the optical touch apparatus 100 of FIG. 1A are similar. The differences are described as below. Please refer to FIG. 5A. In this embodiment, the quantity of an optical sensing module 520 is one, and the optical sensing module 520 is adjacent to one of the corner C1 or corner C2 close to the first side S1, as long as the sensing range of the optical sensing module 520 covers the touch area TA. For example, in this embodiment, the optical sensing module 520 are adjacent to the corner C1 intersected by the first side S1 and the third side S3. In addition, as illustrated from FIG. 5B to FIG. 5C, the optical touch apparatus 100 sets the predetermined region of interest RI for each of the plurality of light emitting elements LE to perform determination on the effective sensing signal, and filters the interference of the stray light signal SA reflected by the highly reflective object A in the environment. Moreover, as illustrated in FIG. 5C, the optical sensing module 520 also determines the sensing signal acquired by the optical sensing module 520 as an effective sensing signal or an invalid sensing signal. In other words, the optical touch apparatus 500 may also perform the optical touch method of FIG. 4A, and the optical sensing module 520 thus acquires the effective sensing signal.

Nevertheless, in this embodiment, since optical touch apparatus 500 only has one the optical sensing module 520, after performing related calculation, only viewing angle information θ of the touch object O relative to the optical sensing module 520 in the touch area TA is acquired. Nonetheless, the processing unit 130 also acquires the information that the viewing angle information θ is acquired when which one of the light emitting elements LE is lit. As such, as illustrated in FIG. 5D, it is also equivalent that the processing unit 130 acquires the viewing angle information θ of the touch object O relative to the optical sensing module 520 in the touch area TA at the same time. In addition, the touch object O is at a position information DX of X-axis direction in the touch area TA. In this way, as illustrated in FIG. 5D, the processing unit 130 calculates the touch coordinates of the touch object O by using the shortest distance information H from the second side S2 to the known optical sensing module 520, the viewing angle information θ, the position information DX, and trigonometric function formula. The real touch point position is acquired.

As such, the optical touch apparatus 500 may also set the predetermined region of interest RI for each of the plurality of light emitting elements LE to determine the effective sensing signal, and filter the interference of the stray light signal SA reflected by the highly reflective object A in the environment. The accuracy of the touch point position is further improved. Similar functions and advantages as the optical touch apparatus 100 are described above, and shall not be repeatedly described herein.

Figure 6A:
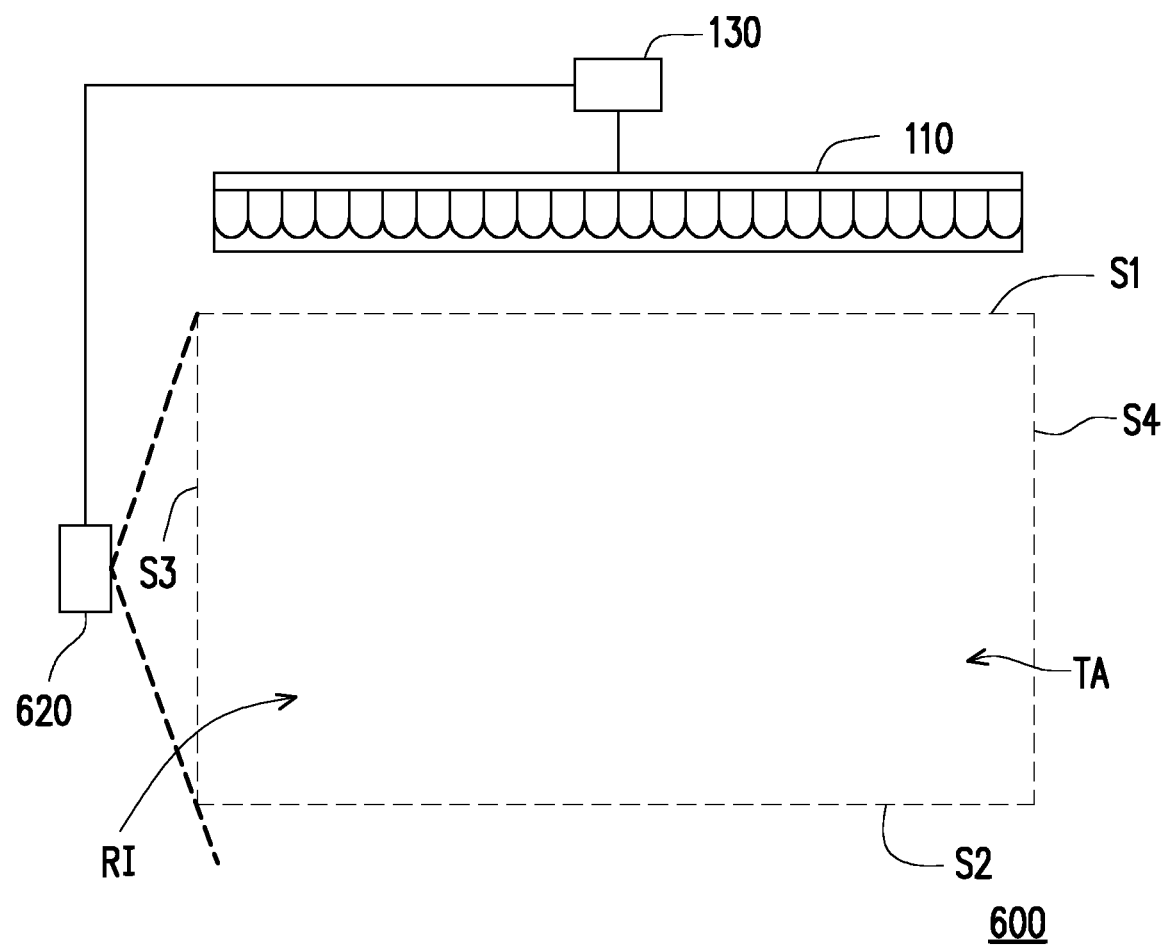
FIG. 6A is an architectural schematic diagram of another optical touch apparatus in accordance with the embodiment of the invention.
Figure 6B:
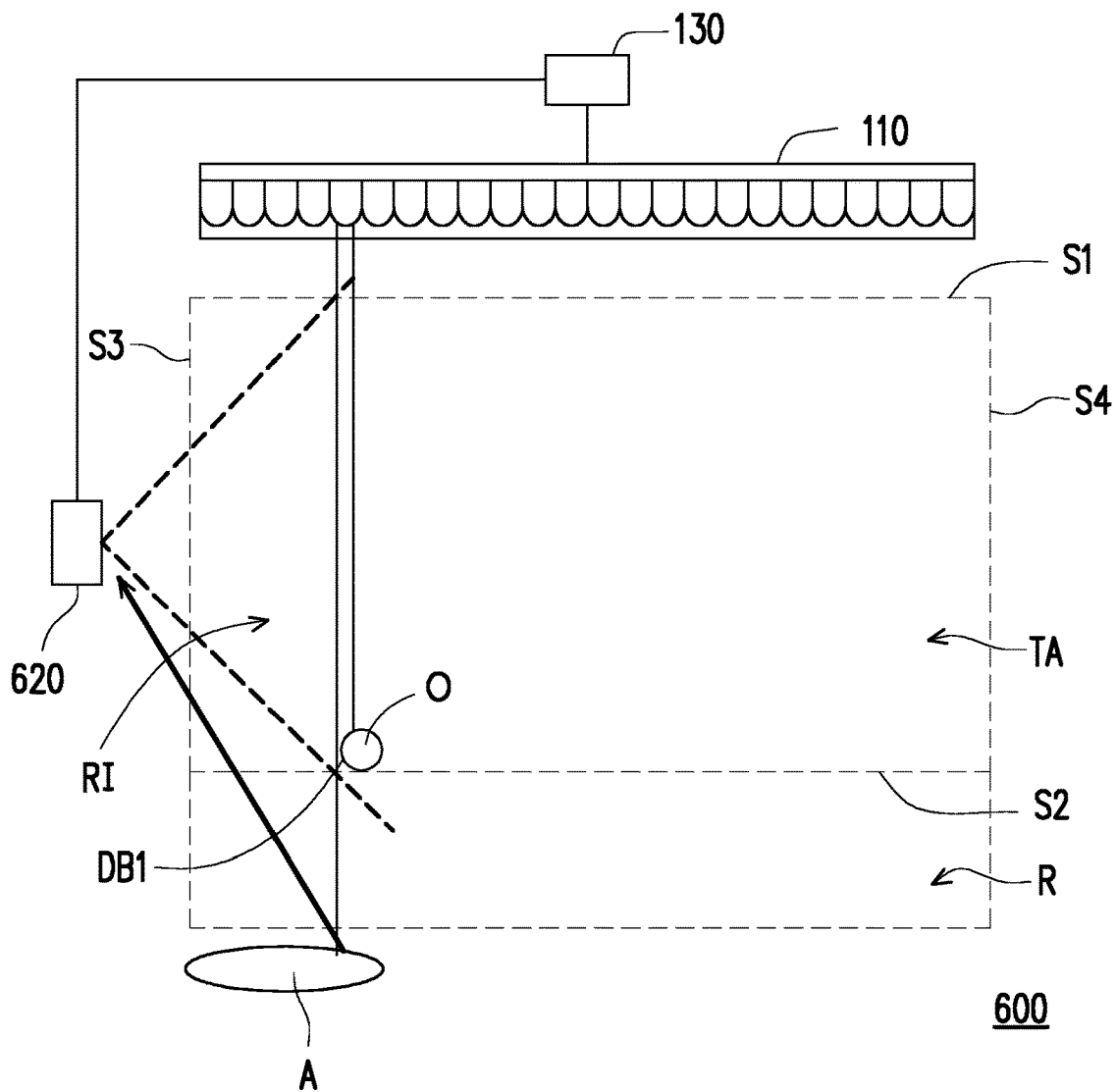
FIG. 6B to FIG. 6C are schematic diagrams of touch points and sensing signals of an optical touch apparatus of FIG. 6A.
Figure 6C:
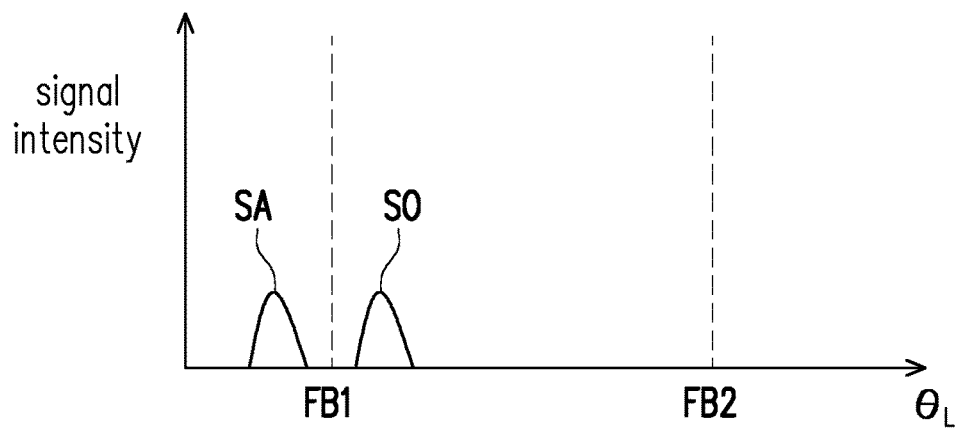
Figure 6D:
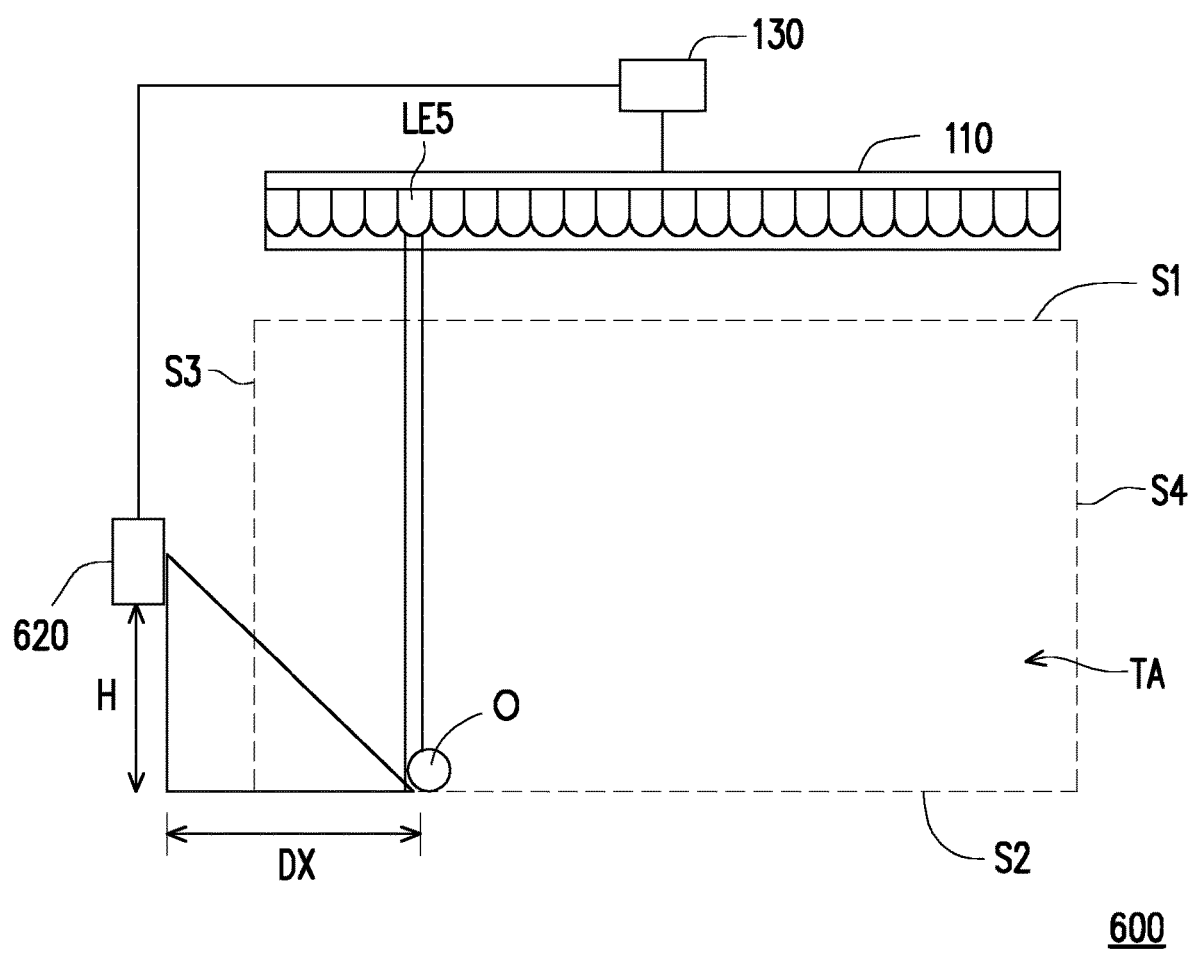
FIG. 6D is a schematic diagram of the touch point calculation method of an optical touch apparatus of FIG. 6A.

FIG. 6A is an architectural schematic diagram of another optical touch apparatus in accordance with the embodiment of the invention. FIG. 6B to FIG. 6C are schematic diagrams of touch points and sensing signals of an optical touch apparatus of FIG. 6A. FIG. 6D is a schematic diagram of the touch point calculation method of an optical touch apparatus of FIG. 6A. Please refer to FIG. 6A to FIG. 6D. An optical touch apparatus 600 of this embodiment and the optical touch apparatus 100 of FIG. 1A are similar. The differences are described as below. Please refer to FIG. 6A. In this embodiment, an optical sensing module 620 is adjacent to the third side S3 or the fourth side S4, and a sensing surface of the optical sensing module 620 faces toward the touch area TA, so that the sensing range covers the touch area TA. In other words, the optical sensing module 620 may be disposed on one of the third side S3 or the fourth side S4, as long as the sensing range of the optical sensing module 620 covers the touch area TA. For example, in this embodiment, the optical sensing module 620 is located on the third side S3, and faces toward the touch area TA, thereby facing the fourth side S4.

Moreover, as illustrated from FIG. 6B to FIG. 6C, the optical touch apparatus 600 may also set the predetermined region of interest RI for each of the plurality of light emitting elements LE to define the effective sensing signal, and filters the interference of the stray light signal SA reflected by the highly reflective object A in the environment. Moreover, as illustrated in FIG. 6C, the optical sensing module 620 also determines whether the sensing signal acquired by the optical sensing module 620 is an effective sensing signal or an invalid sensing signal. In other words, the optical touch apparatus 600 may also perform the optical touch method of FIG. 4A, and the optical sensing module 620 thus acquires the effective sensing signal.

Furthermore, similar to the optical touch apparatus 500 in FIG. 5, in this embodiment, the processing unit 130 of the optical touch apparatus 600 also acquires the viewing angle information θ of the touch object O relative to the optical sensing module 620 in the touch area TA and the position information DX of X-axis direction in the touch area TA at the same time. In this way, the processing unit 130 of the optical touch apparatus 600 calculates the touch coordinates of the touch object O by using the shortest distance information H from the second side S2 to the known optical sensing module 620, the viewing angle information θ, the position information DX, and trigonometric function formula. The real touch point position is acquired.

As such, the optical touch apparatus 600 may also set the predetermined region of interest RI for each of the plurality of light emitting elements LE to determine the effective sensing signal, and filter the interference of the stray light signal SA reflected by the highly reflective object A in the environment. The accuracy of the touch point position is further improved. Similar functions and advantages as the optical touch apparatus 100 are described above, and shall not be repeatedly described herein.

In summary of the above, the optical touch apparatus of the invention, and the optical touch methods set a predetermined region of interest for each light emitting element of the light source module to perform determination on the effective sensing signal, and filter the interference of the stray light signal reflected by the highly reflective object in the environment. The accuracy of the touch point position is further improved.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An optical touch apparatus, having a touch area, the touch area having a first side and a second side, the first side and the second side opposite to each other, and the optical touch apparatus comprising:

a light source module, comprising a plurality of light emitting elements, wherein the plurality of light emitting elements are adjacent to the first side of the touch area, and are arranged along the first side, each of the plurality of light emitting elements respectively provides a detecting beam to the touch area in different time periods, each of the detecting beams is a collimating detecting beam, the collimating detecting beam provided by each of the plurality of light emitting elements and the first side as well as the second side are intersected in a first detection boundary position and a second detection boundary position, when one of the plurality of the light emitting elements provides the collimating detecting beam, a connection of the position of the first detection boundary position as well as the second detection boundary position of the collimating detecting beam and the position of the at least one optical sensing module defines a corresponding predetermined region of interest of the collimating detecting beam;

at least one optical sensing module, having an optical axis direction, and the optical axis direction deviated from a traveling direction of the detecting beam in the touch area; and a processing unit, coupled to the light source module and the at least one optical sensing module, wherein the processing unit controls each of the plurality of light emitting elements of the light source module to alternately provide each of the detecting beams to the touch area, and when each of the plurality of light emitting elements provides each of the detecting beams, the processing unit controls the at least one optical sensing module to respectively detect the corresponding predetermined region of interest according to a position of each of the detecting beams, and thereby outputs a sensing signal.

2. The optical touch apparatus according to claim 1, wherein each of the detecting beams is a collimating detecting beam, the processing unit controls one of the light emitting elements of the light source module to provide the collimating detecting beam to the touch area, and after steps that each of the other light emitting elements of the light source module provides each of the collimating detecting beams to the touch area are completed, the processing unit controls one of the light emitting elements of the light source module to provide the collimating detecting beam to the touch area again.

3. The optical touch apparatus according to claim 2, wherein the processing unit controls each of the plurality of light emitting elements in sequence to provide each of the collimating detecting beams to the touch area.

4. The optical touch apparatus according to claim 1, wherein when the processing unit respectively detects the corresponding predetermined region of interest, the at least one optical sensing module generates the sensing signal according to received light, and the processing unit determines whether the sensing signal is located in a range of the predetermined region of interest corresponding to the collimating detecting beam, and determines whether the sensing signal is greater than a threshold, when the sensing signal is greater than the threshold, after the sensing signal is determined as an effective sensing signal, the corresponding effective sensing signal is output.

5. The optical touch apparatus according to claim 1, wherein each of the detecting beams is a collimating detecting beam, and the width size of each of the collimating detecting beams is smaller than the size of the touch object.

6. The optical touch apparatus according to claim 1, wherein the quantity of the at least one optical sensing module is one, and the optical sensing module is adjacent to one of the corner adjacent to the first side.

7. The optical touch apparatus according to claim 1, wherein the touch area has a third side and a fourth side, the third side and the fourth side are opposite to each other, and the third side and the fourth side are connected to the first side and the second side, and the quantity of the at least one optical sensing module is one, the optical sensing module is adjacent to the third side or the fourth side.

8. The optical touch apparatus according to claim 1, wherein each of the detecting beams is a collimating detecting beam, and traveling directions of the collimating detecting beams of the light emitting elements are the same.

9. The optical touch apparatus according to claim 1, wherein the quantity of the at least one optical sensing module is two, the optical sensing modules are respectively configured to the corresponding two corners of the touch area, and the optical axis directions of each of the optical sensing module and traveling directions of the detecting beam in the touch area are not parallel.

10. An optical touch method, comprising:
controlling a plurality of light emitting elements of a light source module to respectively provide a detecting beam to a touch area in different time periods, wherein the touch area has a first side and a second side, the first side and the second side are opposite to each other, and the light emitting elements are adjacent to the first side of the touch area, and are arranged along the first side, wherein each of the detecting beams is a collimating detecting beam, and the collimating detecting beam provided by each of the plurality of light emitting elements and the first side as well as the second side are intersected in a first detection boundary position and a second detection boundary position, when one of the plurality of the light emitting elements provides the collimating detecting beam, a connection of the position of the first detection boundary position as well as the second detection boundary position of the collimating detecting beam and the position of the at least one optical sensing module defines the corresponding predetermined region of interest of the collimating detecting beam; and
controlling at least one optical sensing module to detect the corresponding predetermined region of interest according to a position of each of the detecting beams and output a sensing signal, wherein the at least one optical sensing module has an optical axis direction, and the optical axis direction is deviated from a traveling direction of the detecting beam in the touch area.

11. The optical touch method according to claim 10, wherein each of the detecting beams is a collimating detecting beam, and methods of controlling the light emitting elements of the light source module to respectively provide the collimating detecting beam to the touch area in different time periods comprising:
controlling one of the light emitting elements of the light source module to provide the collimating detecting beam to the touch area, and after steps that each of the other light emitting elements of the light source module provides each of the collimating detecting beams to the touch area are completed, the processing unit controlling one of the light emitting elements of the light source module to provide the collimating detecting beam to the touch area again.

12. The optical touch method according to claim 11, wherein a method of controlling the light emitting elements of the light source module to provide the collimating detecting beam to the touch area in different time periods comprising:
controlling each of the plurality of light emitting elements of the light source module in sequence to provide the touch area to each of the collimating detecting beams.

13. The optical touch method according to claim 10, wherein methods of controlling the at least one optical sensing module according to a position of the collimating detecting beam to respectively detect the corresponding predetermined region of interest and output the sensing signal comprising: generating the sensing signal according to received light by the at least one optical sensing module; determining whether the sensing signal is located in a range of the corresponding predetermined region of interest of the collimating detecting beam, and determining whether the sensing signal is greater than a threshold, when the sensing signal is greater than the threshold, the sensing signal is determined as an effective sensing signal; and outputting the effective sensing signal.

14. The optical touch method according to claim 10, wherein each of the detecting beams is a collimating detecting beam, and the width size of each of the collimating detecting beams is smaller than the size of the touch object.

15. The optical touch method according to claim 10, wherein the quantity of the at least one optical sensing module is one, and the optical sensing module is adjacent to one of the corner adjacent to the first side.

16. The optical touch method according to claim 10, wherein the touch area has a third side and a fourth side, the third side and the fourth side are opposite to each other, and the third side and the fourth side are connected to the first side and the second side, and the quantity of the at least one optical sensing module is one, the optical sensing module is adjacent to the third side or the fourth side.

17. The optical touch method according to claim 10, wherein each of the detecting beams is a collimating detecting beam, and traveling directions of the collimating detecting beams of the light emitting elements are the same.

18. The optical touch method according to claim 10, wherein the quantity of the at least one optical sensing module is two, the optical sensing modules are respectively configured corresponding to two corners of the touch area, and the optical axis directions of each of the optical sensing module and traveling directions of the detecting beam in the touch area are not parallel.

* * * * *